United States Patent
Hirai et al.

(10) Patent No.: US 11,851,508 B2
(45) Date of Patent: Dec. 26, 2023

(54) ACID-TYPE SULFONIC ACID GROUP-CONTAINING POLYMER, LIQUID COMPOSITION, POLYMER ELECTROLYTE MEMBRANE, MEMBRANE ELECTRODE ASSEMBLY, POLYMER ELECTROLYTE FUEL CELL AND ION EXCHANGE MEMBRANE FOR WATER ELECTROLYSIS

(71) Applicant: AGC Inc., Tokyo (JP)

(72) Inventors: Takeshi Hirai, Tokyo (JP); Susumu Saito, Tokyo (JP); Hiroyuki Watabe, Tokyo (JP); Chikaya Tamitsuji, Tokyo (JP); Daisuke Jomuta, Tokyo (JP)

(73) Assignee: AGC Inc., Tokyo (JP)

( * ) Notice: Subject to any disclaimer, the term of this patent is extended or adjusted under 35 U.S.C. 154(b) by 249 days.

(21) Appl. No.: 17/330,788

(22) Filed: May 26, 2021

(65) Prior Publication Data
US 2021/0301044 A1  Sep. 30, 2021

Related U.S. Application Data

(63) Continuation of application No. PCT/JP2019/047936, filed on Dec. 6, 2019.

(30) Foreign Application Priority Data

Dec. 7, 2018 (JP) ................. 2018-230213

(51) Int. Cl.
*C08F 16/30* (2006.01)
*B01J 39/05* (2017.01)
(Continued)

(52) U.S. Cl.
CPC .............. *C08F 16/30* (2013.01); *B01J 39/05* (2017.01); *B01J 39/20* (2013.01); *C08J 5/2231* (2013.01);
(Continued)

(58) Field of Classification Search
CPC . C08F 16/30; B01J 39/05–20; H01M 8/1004; H01M 8/1023; H01M 8/1039; H01M 8/1067
See application file for complete search history.

(56) References Cited

U.S. PATENT DOCUMENTS

2002/0106550 A1\* 8/2002 Nishiki ............... H01M 8/1088
429/494
2008/0138685 A1  6/2008 Kaneko et al.
(Continued)

FOREIGN PATENT DOCUMENTS

CN     105358592 A    2/2016
JP     2010284948 A  12/2010
(Continued)

OTHER PUBLICATIONS

Machine translation of JP 2010284948, accessed Apr. 24, 2023 (Year: 2023).\*
(Continued)

*Primary Examiner* — Milton I Cano
*Assistant Examiner* — Albert Michael Hilton
(74) *Attorney, Agent, or Firm* — Element IP, PLC

(57) ABSTRACT

An acid-type sulfonic acid group-containing polymer containing perfluoromonomer units, no monomer units having a halogen atom other than a fluorine atom, and acid type sulfonic acid groups, whose hydrogen gas permeability coefficient under the conditions of a temperature of 80° C. and a relative humidity of 10% is at most $2.5 \times 10^{-9}$ cm$^3$·cm/ (s·cm$^2$·cmHg), and whose mass reduction rate when immersed in hot water at 120° C. for 24 hours is at most 15 mass %. Liquid composition, membrane electrode assembly, polymer electrolyte fuel cell, and ion exchange membrane utilizing the acid-type sulfonic acid group-containing polymer.

20 Claims, 1 Drawing Sheet

(51) Int. Cl.
  *B01J 39/20* (2006.01)
  *C08J 5/22* (2006.01)
  *C25B 1/04* (2021.01)
  *C25B 13/08* (2006.01)
  *H01M 8/1004* (2016.01)
  *H01M 8/1023* (2016.01)
  *H01M 8/1039* (2016.01)
  *H01M 8/1067* (2016.01)
  *H01M 8/10* (2016.01)

(52) U.S. Cl.
  CPC ............... *C25B 1/04* (2013.01); *C25B 13/08* (2013.01); *H01M 8/1004* (2013.01); *H01M 8/1023* (2013.01); *H01M 8/1039* (2013.01); *H01M 8/1067* (2013.01); *C08J 2329/10* (2013.01); *H01M 2008/1095* (2013.01)

(56) References Cited

U.S. PATENT DOCUMENTS

2019/0131646 A1  5/2019  Saito et al.
2019/0140299 A1  5/2019  Saito et al.

FOREIGN PATENT DOCUMENTS

| WO | WO 2017/221840 A1 | 12/2017 |
| WO | WO 2018/012374 A1 | 1/2018 |
| WO | WO 2019/045063 A1 | 3/2019 |

OTHER PUBLICATIONS

International Search Report dated Mar. 10, 2020 in PCT/JP2019/047936, filed on Dec. 6, 2019 2 pages.
Mauritz, K.A., et al., "State of Understanding of Nafion", Chem. Rev., 2004, vol. 104, pp. 4535-4585, XP002516304.

* cited by examiner

ACID-TYPE SULFONIC ACID GROUP-CONTAINING POLYMER, LIQUID COMPOSITION, POLYMER ELECTROLYTE MEMBRANE, MEMBRANE ELECTRODE ASSEMBLY, POLYMER ELECTROLYTE FUEL CELL AND ION EXCHANGE MEMBRANE FOR WATER ELECTROLYSIS

TECHNICAL FIELD

The present invention relates to an acid-type sulfonic acid group-containing polymer, a liquid composition, a polymer electrolyte membrane, a membrane electrode assembly, a polymer electrolyte fuel cell and an ion exchange membrane for water electrolysis.

BACKGROUND ART

A polymer electrolyte fuel cell is, for example, one in which a membrane electrode assembly is sandwiched between two separators to form a cell, and a plurality of such cells are stacked. The membrane electrode assembly is one comprising an anode and a cathode each having a catalyst layer, and a polymer electrolyte membrane disposed between the anode and the cathode. The polymer electrolyte membrane is, for example, one in which a polymer having acid-type sulfonic acid groups is formed into a membrane.

At the time of conducting power generation in a polymer electrolyte fuel cell, the polymer electrolyte membrane is exposed to high temperature and high humidity conditions, and therefore, the acid-type sulfonic acid group-containing polymer constituting the polymer electrolyte membrane is required to have hot water resistance.

Further, at the time of conducting power generation in a polymer electrolyte fuel cell, it is required that hydrogen gas supplied to the anode side will not permeate the polymer electrolyte membrane and move to the cathode side. Therefore, the acid-type sulfonic acid group-containing polymer constituting the polymer electrolyte membrane is required to have low hydrogen gas permeability (hydrogen gas barrier property).

Further, the polymer electrolyte water electrolyzer has the same construction as the polymer electrolyte fuel cell.

At the time of conducting electrolysis in a polymer electrolyte water electrolyzer, the ion exchange membrane for water electrolysis (polymer electrolyte membrane) is similarly exposed to high temperature and high humidity conditions, and therefore, the acid-type sulfonic acid group-containing polymer constituting the ion exchange membrane for water electrolysis, is required to have hot water resistance.

Further, at the time of conducting electrolysis in a polymer electrolyte water electrolyzer, it is required that oxygen generated on the anode side and hydrogen generated on the cathode side do not permeate through the ion exchange membrane for water electrolysis and mix. Therefore, the acid-type sulfonic acid group-containing polymer constituting the ion exchange membrane for water electrolysis is also required to have low gas permeability.

The following has been proposed as an acid-type sulfonic acid group-containing polymer having excellent hot water resistance.

(1) An acid-type sulfonic acid group-containing polymer which has units represented by the following formula and tetrafluoroethylene units, and of which the equivalent weight EW is from 400 to 550 g/equivalent, and the mass reduction rate when immersed in hot water at 120° C. for 24 hours, is at most 15 mass % (Patent Document 1):

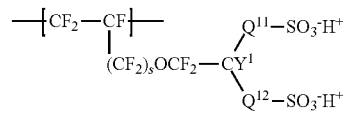

Here, is a perfluoroalkylene group which may have an etheric oxygen atom, $Q^{12}$ is a single bond or a perfluoroalkylene group which may have an etheric oxygen atom, $Y^1$ is a fluorine atom or a monovalent perfluoroorganic group, and s is 0 or 1.

However, the acid-type sulfonic acid group-containing polymer of (1) has a high hydrogen gas permeation coefficient.

The following has been proposed as an acid-type sulfonic acid group-containing polymer having excellent hydrogen gas barrier properties and hot water resistance.

(2) An acid-type sulfonic acid group-containing polymer having from 10 to 25 mol % of units represented by the above formula and from 5 to 90 mol % of chlorotrifluoroethylene units (Patent Document 2).

PRIOR ART DOCUMENTS

Patent Documents

Patent Document 1: WO2017/221840
Patent Document 2: WO2018/012374

DISCLOSURE OF INVENTION

Technical Problem

However, the acid-type sulfonic acid group-containing polymer (2) has chlorotrifluoroethylene units, and therefore, there is such a problem that at the time of polymerizing monomer to obtain the polymer, chlorotrifluoroethylene acts as a chain transfer agent, whereby a large amount of an oligomer is likely to be generated. If the oligomer is contained in the acid-type sulfonic acid group-containing polymer, the polymer may be eluted, for example, at the time of conducting power generation in the polymer electrolyte fuel cell. Therefore, in a post-treatment step of the polymer, it is necessary to remove the oligomer from the polymer by a precipitation operation or a washing operation, and at the time of reusing the precipitation solvent or the washing solvent, it is necessary to remove the oligomer, which complicate the production process. In addition, by the amount of the oligomer produced, the yield of the polymer deteriorates, which increases the production cost.

The present invention provides an acid-type sulfonic acid group-containing polymer excellent in hydrogen gas barrier properties and hot water resistance, wherein the amount of an oligomer generated during production is small; a liquid composition capable of forming a membrane excellent in hydrogen gas barrier properties and hot water resistance, wherein the amount of an oligomer generated during production is small; a polymer electrolyte membrane excellent in hydrogen gas barrier properties and hot water resistance, wherein the amount of an oligomer generated during production is small; a membrane electrode assembly and a polymer electrolyte fuel cell provided with a polymer electrolyte membrane excellent in hydrogen gas barrier properties and hot water resistance, wherein the amount of an oligomer generated during production is small; and an ion exchange membrane for water electrolysis excellent in hydrogen gas barrier properties and hot water resistance, wherein the amount of an oligomer generated during production is small.

Solution to Problem

The present invention has the following embodiments.
<1> An acid-type sulfonic acid group-containing polymer which is a polymer having perfluoromonomer units, no monomer units having a halogen atom other than a fluorine atom, and acid-type sulfonic acid groups, and of which the hydrogen gas permeation coefficient under the conditions of a temperature of 80° C. and a relative humidity of 10%, is at most $2.5 \times 10^{-9}$ cm$^3$·cm/(s·cm$^2$·cmHg), and the mass reduction rate when immersed in hot water at 120° C. for 24 hours, is at most 15 mass %.
<2> The acid-type sulfonic acid group-containing polymer according to <1>, of which the ion exchange capacity is from 1.10 to 2.50 milliequivalent/g dry resin.
<3> The acid-type sulfonic acid group-containing polymer according to <1> or <2>, wherein the TQ value of a polymer having fluorosulfonyl groups, which is a precursor of the polymer having acid-type sulfonic acid groups, is at least 220° C.
<4> The acid-type sulfonic acid group-containing polymer according to any one of <1> to <3>, which is a perfluoropolymer comprising perfluoromonomer units having a sulfonic acid group and perfluoromonomer units not having a sulfonic acid group or its precursor group.
<5> The acid-type sulfonic acid group-containing polymer according to any one of <1> to <4>, which has tetrafluoroethylene units as the perfluoromonomer units not having a sulfonic acid group or its precursor group.
<6> The acid-type sulfonic acid group-containing polymer according to any one of <1> to <5>, which has at least units represented by the following formula u1 as the perfluoromonomer units:

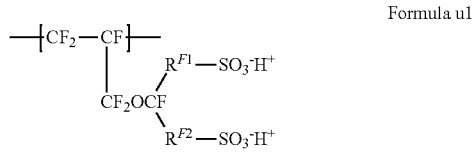

Formula u1 where $R^{F1}$ and $R^{F2}$ are each independently a $C_{1-3}$ perfluoroalkylene group.
<7> An acid-type sulfonic acid group-containing polymer which is a polymer having units represented by the following formula u1, and of which the mass reduction rate when immersed in hot water at 120° C. for 24 hours, is at most 15 mass %:

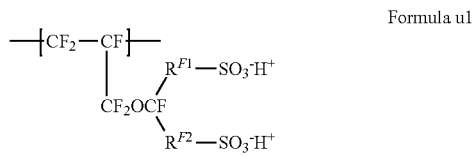

Formula u1 where $R^{F1}$ and $R^{F2}$ are each independently a $C_{1-3}$ perfluoroalkylene group.
<8> The acid-type sulfonic acid group-containing polymer according to <7>, of which the ion exchange capacity is from 1.10 to 2.50 milliequivalent/g dry resin.
<9> The acid-type sulfonic acid group-containing polymer according to <7> or <8>, wherein the TQ value of a polymer having fluorosulfonyl groups, which is a precursor of the polymer having units represented by the formula u1, is at least 220° C.
<10> The acid-type sulfonic acid group-containing polymer according to any one of <7> to <9>, of which the hydrogen gas permeation coefficient under the conditions of a temperature of 80° C. and a relative humidity of 10%, is at most $2.5 \times 10^{-9}$ cm$^3$·cm/(s·cm$^2$·cmHg).
<11> A liquid composition comprising the acid-type sulfonic acid group-containing polymer as defined in any one of <1> to <10> and a liquid medium.
<12> A polymer electrolyte membrane comprising the acid-type sulfonic acid group-containing polymer as defined in any one of <1> to <10>.
<13> A membrane electrode assembly comprising an anode having a catalyst layer, a cathode having a catalyst layer, and the polymer electrolyte membrane as defined in <12>, which is disposed between the anode and the cathode.
<14> A polymer electrolyte fuel cell comprising the membrane electrode assembly as defined in <13>.
<15> An ion exchange membrane for water electrolysis, comprising the acid-type sulfonic acid group-containing polymer as defined in any one of <1> to <10>.

Advantageous Effects of Invention

The acid-type sulfonic acid group-containing polymer of the present invention is excellent in hydrogen gas barrier properties and hot water resistance, wherein the amount of an oligomer generated during production is small.

According to the liquid composition of the present invention, it is possible to form a membrane excellent in hydrogen gas barrier properties and hot water resistance, wherein the amount of an oligomer generated during production is small.

The polymer electrolyte membrane of the present invention is excellent in hydrogen gas barrier properties and hot water resistance, wherein the amount of an oligomer generated during production is small.

The membrane electrode assembly and the polymer electrolyte fuel cell of the present invention are provided with a polymer electrolyte membrane excellent in hydrogen gas barrier properties and hot water resistance, wherein the amount of an oligomer generated during production is small.

The ion exchange membrane for water electrolysis of the present invention is excellent in hydrogen gas barrier properties and hot water resistance, wherein the amount of an oligomer generated during production is small.

Therefore, by the sulfonic acid group-containing polymer, liquid composition, polymer electrolyte membrane, membrane electrode assembly and polymer electrolyte fuel cell of the present invention, it is possible to realize a polymer electrolyte fuel cell which has a low fuel consumption rate, has high durability even under high temperature and high humidity conditions, is simple in the production process and is low in the production cost.

Likewise, by the ion exchange membrane for water electrolysis of the present invention, it is possible to realize a polymer electrolyte water electrolyzer which produces gas in a high purity, has high durability even under high temperature and high humidity conditions, is simple in the production process and is low in the production cost.

DESCRIPTION OF EMBODIMENTS

In the present specification, a compound represented by the formula 1 is referred to as compound 1. Compounds represented by other formulas are also referred to in the same manner.

In the present specification, units represented by the formula u1 are referred to as units u1. The constituting units represented by other formulas are also referred to in the same manner.

The following definitions of terms apply throughout the specification and claims.

A "sulfonic acid group" is a general term for a salt-type sulfonic acid group ($-SO_3^- M^+$, where $M^+$ is a metal ion or an ammonium ion) and an acid-type sulfonic acid group ($-SO_3^- H^+$).

An "ion exchange group" is a group in which a cation contained in the group can be exchanged with another cation.

A "unit" in a polymer is a general term for an atomic group directly formed by polymerization of one molecule of a monomer and an atomic group obtained by chemically converting a part of the atomic group.

A "perfluoropolymer" means that all monomer units constituting the polymer consist of perfluoromonomers.

A "perfluoromonomer" means a monomer in which all hydrogen atoms bonded to carbon atoms are substituted by fluorine atoms.

The "hydrogen gas permeation coefficient" of the polymer is a value measured in accordance with JIS K 7126-2: 2006, and it is a value obtained by setting a membrane made of a polymer at 80° C., measuring the hydrogen gas permeability of 10% humidification by the isobaric method, and dividing the permeation amount by the thickness of the membrane.

The "mass reduction rate when immersed in hot water at 120° C. for 24 hours" of the polymer is obtained by the method described in Examples.

The "ion exchange capacity" of the polymer is obtained by the method described in Examples.

The "TQ value" of the polymer is obtained by the method described in Examples.

The "conductivity" of the polymer is obtained by the method described in Examples.

Figure 1:
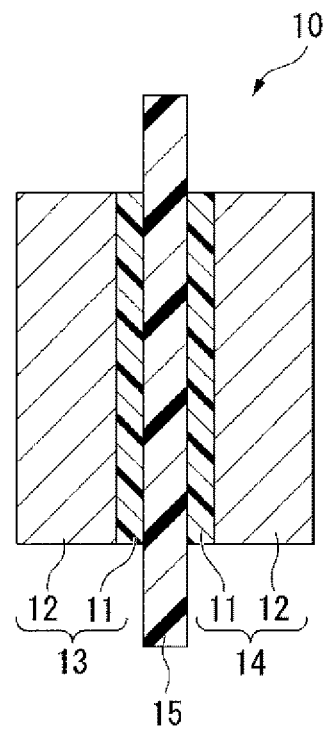
FIG. 1 is a schematic cross-sectional view showing an example of the membrane electrode assembly of the present invention.
Figure 2:
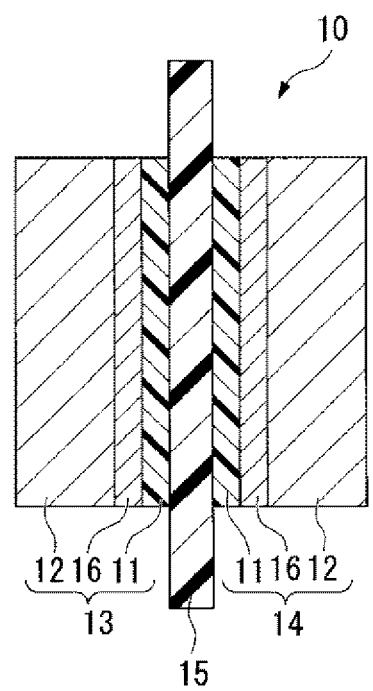
FIG. 2 is a schematic cross-sectional view showing another example of the membrane electrode assembly of the present invention.

The dimensional ratios in FIGS. 1 and 2 are different from the actual ones for convenience of explanation.

First Embodiment of Acid-Type Sulfonic Acid Group-Containing Polymer

The first embodiment of the acid-type sulfonic acid group-containing polymer of the present invention is a polymer having perfluoromonomer units, not having monomer units having a halogen atom other than a fluorine atom and having acid-type sulfonic acid groups ($-SO_3^- H^+$) (hereinafter referred to as "polymer H1").

The hydrogen gas permeation coefficient at a temperature of 80° C. and a relative humidity of 10%, of the polymer H1, is at most $2.5 \times 10^{-9}$ $cm^3 \cdot cm/(s \cdot cm^2 \cdot cmHg)$, preferably at most $2.2 \times 10^{-9}$ $cm^3 \cdot cm/(s \cdot cm^2 \cdot cmHg)$, more preferably at most $2.0 \times 10^{-9}$ $cm^3 \cdot cm/(s \cdot cm^2 \cdot cmHg)$, further preferably at most $1.8 \times 10^{-9}$ $cm^3 \cdot cm/(s \cdot cm^2 \cdot cmHg)$. When the hydrogen gas permeation coefficient under the conditions of a temperature of 80° C. and a relative humidity of 10% is at most the upper limit value of the above range, the hydrogen gas barrier property of the polymer H1 is excellent. From the viewpoint of maintaining a high conductivity of the polymer H1, the hydrogen gas permeation coefficient of the polymer H1 under the conditions of a temperature of 80° C. and a relative humidity of 10% is preferably at least $1.0 \times 10^{-12}$ $cm^3 \cdot cm/(s \cdot cm^2 \cdot cmHg)$, more preferably at least $1.0 \times 10^{-11}$ $cm^3 \cdot cm/(s \cdot cm^2 \cdot cmHg)$.

The mass reduction rate of the polymer H1 when immersed in hot water at 120° C. for 24 hours is at most 15 mass %, preferably at most 12 mass %, more preferably at most 10 mass %. When the mass reduction rate when immersed in hot water at 120° C. for 24 hours is at most the upper limit value of the above range, the hot water resistance of the polymer H1 is excellent. The lower the mass reduction rate, the better, and the lower limit is 0 mass %.

The hydrogen gas permeation coefficient under the conditions of a temperature of 80° C. and a relative humidity of 10% and the mass reduction rate when immersed in hot water at 120° C. for 24 hours, of the polymer H1, can be adjusted by, for example, the composition of the monomer units, the molecular weight (the TQ value of the polymer F1 as described later), the ion exchange capacity, etc., of the polymer H1.

The ion exchange capacity of the polymer H1 is preferably from 1.10 to 2.50 milliequivalent/g dry resin, more preferably from 1.70 to 2.48 milliequivalent/g dry resin, further preferably from 1.91 to 2.47 milliequivalent/g dry resin, particularly preferably from 1.95 to 2.46 milliequivalent/g dry resin. When the ion exchange capacity is at least the lower limit value in the above range, the conductivity of the polymer H1 becomes high, so that a sufficient cell output can be obtained when used as a polymer electrolyte membrane of a polymer electrolyte fuel cell. When the ion exchange capacity is at most the upper limit value in the above range, swelling at the time when the polymer H1 is saturated, can be suppressed, and the mechanical strength becomes high when used as a polymer electrolyte membrane. Further, from the viewpoint of enhancing the solubility of the polymer H1 in obtaining the liquid composition, the ion exchange capacity is preferably from 1.50 to 2.50 milliequivalent/g dry resin, more preferably from 1.70 to 2.50 milliequivalent/g, further preferably from 1.91 to 2.47 milliequivalent/g dry resin, particularly preferably from 1.95 to 2.46 milliequivalent/g dry resin.

The conductivity of the polymer H1 at a temperature of 80° C. and a relative humidity of 50% RH is preferably at least 0.02 S/cm, more preferably at least 0.10 S/cm, further preferably at least 0.14 S/cm, particularly preferably at least 0.15 S/cm. When the conductivity is at least the lower limit value in the above range, sufficient cell output can be obtained when used as a polymer electrolyte membrane. The higher the conductivity, the better, and the upper limit is not limited.

The perfluoromonomer units may, for example, be perfluoromonomer units not having an ion exchange group or its precursor group, or perfluoromonomer units having an ion exchange group.

The perfluoromonomer not having an ion exchange group or its precursor group may, for example, be tetrafluoroethylene (hereinafter referred to as "TFE"), hexafluoropropylene, a perfluoro(alkyl vinyl ether), or perfluoromonomers having a 5-membered ring as described in WO2011/013578.

The perfluoromonomer units having an ion exchange group may, for example, be perfluoromonomer units having a known ion exchange group as described in Patent Documents 1, 2, etc., or units u1 as described later.

The polymer H1 does not have monomer units having a halogen atom other than a fluorine atom.

A monomer having a halogen atom other than a fluorine atom may, for example, be chlorotrifluoroethylene, bromotrifluoroethylene, iodotrifluoroethylene or dichlorodifluoroethylene.

Since the polymer H1 does not have monomer units having a halogen atom other than a fluorine atom, a chain transfer reaction is unlikely to occur when the monomer is polymerized to produce a polymer, and the amount of an oligomer generated during the production is small.

The polymer H1 may have units based on a monomer other than the perfluoromonomer (hereinafter referred to as "another monomer"), as the case requires, as long as the effects of the present invention are not impaired.

Another monomer may, for example, be trifluoroethylene, vinylidene fluoride, vinyl fluoride, ethylene, propylene, a (perfluoroalkyl) ethylene, or a (perfluoroalkyl) propene.

The polymer H1 is preferably a perfluoropolymer composed of perfluoromonomer units having a sulfonic acid group and perfluoromonomer units not having a sulfonic acid group or its precursor group, from such a viewpoint that it is excellent in conductivity, mechanical properties and chemical durability. As the perfluoromonomer units not having a sulfonic acid group or its precursor group, TFE units are particularly preferred.

The polymer H1 is preferably one which has at least units u1 as the perfluoromonomer units, from such a viewpoint that it tends to be a polymer having a low hydrogen gas permeation coefficient. As the polymer H1 having units u1, one having TFE units further, is preferred from such a viewpoint that it is excellent in mechanical properties and chemical durability.

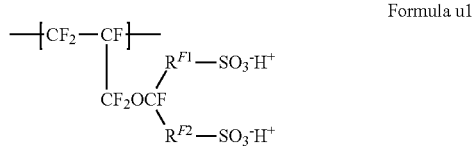

Formula u1

Here, $R^{F1}$ and $R^{F2}$ are each independently a $C_{1-3}$ perfluoroalkylene group. $R^{F1}$ and $R^{F2}$ may be the same or different.

As $R^{F1}$ and $R^{F2}$, for example, —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, and —$C(CF_3)(CF_3)$— may be mentioned. From such a viewpoint that raw material is less expensive, production of compound 7 to be described later will be easy, and it is possible to make the ion exchange capacity of polymer H1 higher, $R^{F1}$ and $R^{F2}$ are preferably $C_{1-2}$ perfluoroalkylene groups. In the case where the number of carbon atoms is 2, a straight chain is preferred. Specifically, —$CF_2$—, —$CF_2CF_2$— or —$CF(CF_3)$— is preferred, and —$CF_2$— is more preferred.

Among all units constituting the polymer H1, the ratio of units u1, TFE units and units other than units u1 and TFE units may be suitably determined depending upon the characteristics and physical properties (hydrogen gas permeability, hot water resistance, ion exchange capacity, conductivity, mechanical strength, elastic modulus, softening temperature, etc.) required for the polymer H1.

The polymer H1 is obtainable, for example, by converting fluorosulfonyl groups (—$SO_2F$) of polymer F1, which will be described later, into acid-type sulfonic acid groups (—$SO_3^-H^+$).

As a method for converting fluorosulfonyl groups into acid-type sulfonic acid groups, there may be a method of hydrolyzing fluorosulfonyl groups in the polymer F1 to salt-type sulfonic acid groups, and then, converting the salt-type sulfonic acid groups to an acid-type to form acid-type sulfonic acid groups.

The hydrolysis may be carried out, for example, by bringing the polymer F1 into contact with a basic compound in a solvent. The basic compound may, for example, be sodium hydroxide, potassium hydroxide or triethylamine. The solvent may, for example, be water, or a mixed solvent of water and a polar solvent. The polar solvent may, for example, be an alcohol (methanol, ethanol, etc.) or dimethyl sulfoxide.

The conversion to an acid type may be carried out, for example, by bringing the polymer having salt-type sulfonic acid groups into contact with an aqueous solution of hydrochloric acid, sulfuric acid, nitric acid or the like. The temperature for the hydrolysis and conversion to an acid type, is preferably from 0 to 120° C. It is preferred to wash the polymer H1 with water after the hydrolysis or conversion to an acid type.

In order to remove organic substances contained as impurities in the polymer H1, the organic substances may be decomposed by a treatment such as immersing the polymer H1 in a hydrogen peroxide solution after the hydrolysis in the salt type, or after the conversion to an acid type.

The concentration of hydrogen peroxide in the hydrogen peroxide solution is preferably from 0.1 to 30 mass %, more preferably at least 1 mass % and less than 10 mass %. When the concentration of hydrogen peroxide in the hydrogen peroxide solution is at least the lower limit value in the above range, the effect of decomposing organic substances is sufficient. When the concentration of hydrogen peroxide in the hydrogen peroxide solution is at most the upper limit value in the above range, the polymer H1 will be hardly decomposed.

The temperature of the hydrogen peroxide solution is preferably from 15 to 90° C., more preferably at least 40° C. and lower than 80° C. When the temperature of the hydrogen peroxide solution is at least the lower limit value in the above range, the effect of decomposing organic substances is sufficient. When the temperature of the hydrogen peroxide solution is at most the upper limit value in the above range, hydrogen peroxide is less likely to decompose.

The time for immersing the polymer H1 in the hydrogen peroxide solution may depend on the thickness of the polymer H1 and the amount of organic substances contained in the polymer H1, but, for example, in a case where the polymer H1 is a membrane having a thickness of 50 µm, from 0.5 to 100 hours is preferred. If the immersion time is less than 0.5 hour, it is difficult to decompose organic substances inside the membrane. Even if it is immersed for more than 100 hours, the effect of further decomposing organic substances cannot be expected.

It is preferred to wash the polymer H1 with water after immersing it in a hydrogen peroxide solution. Ultrapure water is preferred as the water to be used for washing with water. In addition, treatment for conversion to an acid type may be performed before washing with water.

The final shape of the polymer H1 after the above treatment may be in the form of a powder, pellets or a membrane.

(Polymer F1)

The polymer F1 as a precursor of the polymer H1, is a polymer having perfluoromonomer units, not having monomer units having a halogen atom other than a fluorine atom, and having fluorosulfonyl groups ($-SO_2F$).

The TQ value of the polymer F1 is preferably at least 220° C., more preferably from 225 to 360° C., further preferably from 230 to 350° C. When the TQ value is at least the lower limit value in the above range, the polymer H1 has a sufficient molecular weight, and the mechanical strength and hot water resistance are further excellent. When the TQ value is at most the upper limit value in the above range, the solubility or dispersibility of the polymer H1 is improved, and the liquid composition described later can be easily prepared. The TQ value is an index for the molecular weight of the polymer F1.

The perfluoromonomer units may, for example, be perfluoromonomer units not having an ion exchange group or its precursor group, or perfluoromonomer units having a precursor group of an ion exchange group.

The perfluoromonomer not having an ion exchange group or its precursor group may be a perfluoromonomer not having an ion exchange group or its precursor group as described for the polymer H1.

The perfluoromonomer units having a precursor group of an ion exchange group may, for example, be perfluoromonomer units having a known fluorosulfonyl group as described in Patent Documents 1 and 2, or units u2 as described later.

The polymer F1 does not have monomer units having a halogen atom other than a fluorine atom.

The monomer having a halogen atom other than a fluorine atom may be the monomer having a halogen atom other than a fluorine atom as described for the polymer H1.

The polymer F1 may have units based on another monomer, as the case requires, as long as the effects of the present invention are not impaired.

Another monomer may be another monomer as described for the polymer H1.

The polymer F1 is preferably one composed of perfluoromonomer units having a fluorosulfonyl group and perfluoromonomer units not having a sulfonic acid group or its precursor group, from such a viewpoint that it is thereby possible to obtain a polymer H1 excellent in conductivity, mechanical properties and chemical durability. As the perfluoromonomer units not having a sulfonic acid group or its precursor group, TFE units are particularly preferred.

The polymer F1 is preferably one having units u2, from such a viewpoint that it is thereby easy to obtain the polymer H1 having a low hydrogen gas permeation coefficient. As the polymer F1 having units u2, one having TFE units further, is preferred from such a viewpoint that it is thereby possible to obtain a polymer H1 excellent in mechanical properties and chemical durability.

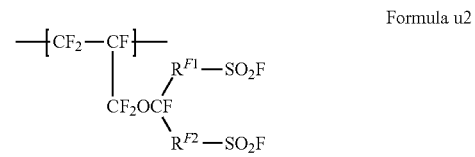

Formula u2

$R^{F1}$ and $R^{F2}$ are the same as $R^{F1}$ and $R^{F2}$ as described for units u1, and the preferred forms are also the same.

Among all units constituting the polymer F1, the ratio of unit u2, TFE units and units other than units u2 and TFE units, may be suitably determined depending on the characteristics and physical properties (hydrogen gas permeability, hot water resistance, ion exchange capacity, conductivity, mechanical strength, elastic modulus, softening temperature, etc.) required for the polymer H1.

The polymer F1 can be produced, for example, by polymerizing monomer components comprising a compound 7 which will be described later, TFE as the case requires, and a monomer other than the compound 7 and TFE.

The polymerization method may, for example, be a bulk polymerization method, a solution polymerization method, a suspension polymerization method, or an emulsion polymerization method. Alternatively, the polymerization may be carried out in liquid or supercritical carbon dioxide.

The polymerization is carried out under such a condition that radicals are generated. The method for generating radicals may be a method of irradiating radiation such as ultraviolet rays, γ-rays or electron beams, or a method of adding a radical initiator. The polymerization temperature is preferably at least 80° C. and at most 250° C., more preferably at least 120° C. and at most 230° C., further preferably at least 140° C. and at most 200° C., particularly preferably at least 147° C. and at most 168° C.

(Compound 7)

The compound 7 is used for the production of the polymer F1.

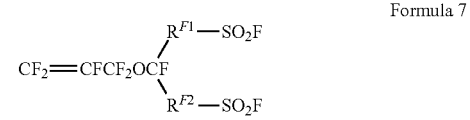

Formula 7

$R^{F1}$ and $R^{F2}$ are the same as $R^{F1}$ and $R^{F2}$ as described for units u1, and the preferred forms are also the same.

The compound 7 may, for example, be compound 7-1.

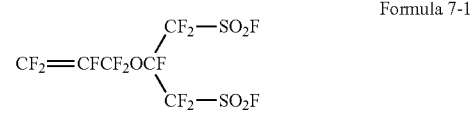

Formula 7-1

The compound 7 may be produced, for example, as follows.

Compound 1 is reacted with a sulfonating agent to obtain compound 2.

Compound 2 is reacted with a chlorinating agent to obtain compound 3.

Compound 3 is reacted with a fluorinating agent to obtain compound 4.

Compound 4 is fluorinated to obtain compound 5.

Compound 5 is reacted with a perfluoroallylating agent (for example, compound 6 described later) to obtain compound 7.

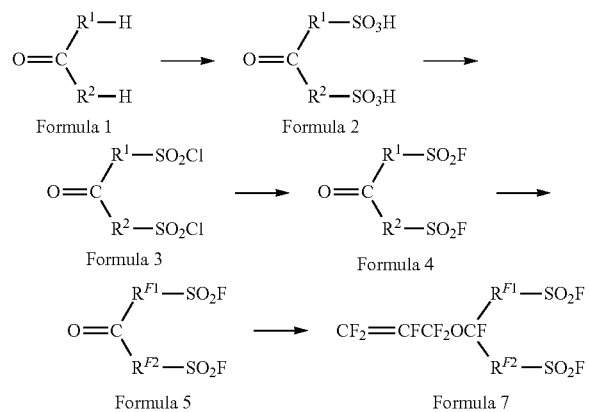

Formula 1  Formula 2  Formula 3  Formula 4  Formula 5  Formula 7

Here, $R^1$ and $R^2$ are each independently a $C_{1-3}$ alkylene group. $R^1$ and $R^2$ may be the same or different.

$R^{F1}$ and $R^{F2}$ are the same as $R^{F1}$ and $R^{F2}$ as described for units u1, and the preferred forms are also the same.

As $R^1$ and $R^2$, for example, —CH$_2$—, —CH$_2$CH$_2$—, —CH(CH$_3$)—, —CH$_2$CH$_2$CH$_2$—, —CH(CH$_2$CH$_3$)—, —CH(CH$_3$)CH$_2$—, —CH$_2$CH(CH$_3$)— or —C(CH$_3$)(CH$_3$)— may be mentioned. As $R^1$ and $R^2$, a $C_{1-2}$ alkylene group is preferred, from such a viewpoint that the raw material compound 1 is cheaper, the production of the compound 7 is easy, and the ion exchange capacity of the polymer H1 can be made higher. In the case where the number of carbon atoms is 2, a straight chain is preferred. Specifically, —CH$_2$—, —CH$_2$CH$_2$— or —CH(CH$_3$)— is preferred, and —CH$_2$— is more preferred.

The compound 1 may, for example, be acetone, methyl ethyl ketone, diethyl ketone, methyl propyl ketone, ethyl propyl ketone, dipropyl ketone, diisopropyl ketone, isopropyl methyl ketone, isopropyl ethyl ketone or isopropyl propyl ketone. Acetone is preferred from such a viewpoint that the compound 1 is cheaper, the production of the compound 7 is easy, and the ion exchange capacity of the polymer H1 per unit molecular weight can be made higher.

The sulfonating agent may, for example, be chlorosulfonic acid, fluorosulfonic acid, sulfur trioxide, a complex of sulfur trioxide, fuming sulfuric acid, or concentrated sulfuric acid.

The reaction temperature of compound 1 and the sulfonating agent is preferably from 0 to 100° C. The reaction solvent may be suitably selected from solvents in which the solvents themselves are less likely to be sulfonated. The reaction solvent may, for example, be methylene chloride, chloroform, carbon tetrachloride, 1,1,1-trichloromethane, cyclohexane, hexane, petroleum ether, pentane, heptane, diethyl ether, acetonitrile or diethyl carbonate. Two or more types of reaction solvents may be used as mixed.

The chlorinating agent may, for example, be thionyl chloride, phosphorus pentachloride, phosphorus trichloride, phosphoryl chloride, chlorosulfonic acid, sulfuryl chloride, oxalyl chloride or chlorine.

The reaction temperature of the compound 2 and the chlorinating agent is preferably from 0 to 100° C. When the reaction temperature is at most the upper limit value in the above range, decomposition of the compound 3 can be suppressed, so that the yield of the compound 3 is improved.

When the reaction temperature is at least the lower limit value in the above range, the reaction rate is increased, and the productivity is improved.

The fluorinating agent may, for example, be potassium hydrogen fluoride, sodium hydrogen fluoride, potassium fluoride, sodium fluoride, cesium fluoride, silver fluoride, quaternary ammonium fluoride (tetraethylammonium fluoride, tetrabutylammonium fluoride, etc.), hydrogen fluoride, hydrofluoric acid or a hydrogen fluoride complex (HF-pyridine complex, HF-triethylamine, etc.).

The reaction temperature of the compound 3 and the fluorinating agent is preferably from −30 to 100° C. The reaction solvent may be suitably selected from polar solvents or low polar solvents which are less susceptible to the fluorination reaction. The reaction solvent may, for example, be methylene chloride, chloroform, carbon tetrachloride, 1,1,1-trichloromethane, diethyl ether, dioxane, tetrahydrofuran, dimethoxyethane, diethylene glycol dimethyl ether, tetraethylene glycol dimethyl ether, dimethyl sulfoxide, sulfolane, N,N-dimethylformamide, acetonitrile, dimethyl carbonate, diethyl carbonate, ethylene carbonate, propylene carbonate or water. Two or more types of reaction solvents may be used as mixed.

The fluorination treatment is carried out by bringing the compound 4 into contact with a fluorine gas or a fluorine compound.

The fluorine compound may, for example, be hydrogen fluoride, halogen fluoride (chlorine trifluoride, iodine pentafluoride, etc.), gaseous fluoride (boron trifluoride, nitrogen trifluoride, phosphorus pentafluoride, silicon tetrafluoride, sulfur hexafluoride, etc.), metal fluoride (lithium fluoride, nickel(II) fluoride, etc.), hypofluorite compounds (trifluoromethylhypofluorite, trifluoroacetylhypofluorite, etc.), electrophilic fluorinating reagents (Selectfluor (registered trademark), N-fluorobenzenesulfonimide, etc.).

As the fluorination treatment, a treatment in which the compound 4 and the fluorine gas are brought into contact with each other, is preferred from such a viewpoint that handling is easy and impurities to be contained in the compound 5 will be reduced. Fluorine gas may be used as diluted with an inert gas such as nitrogen gas. The temperature for the fluorination treatment is preferably from −20 to 350° C. The reaction solvent may be suitably selected from solvents having high solubility of the compound 4 or the compound 5 and solvents which are less likely to be subjected to the fluorination treatment. The reaction solvent may, for example, be acetonitrile, chloroform, dichloromethane, trichlorofluoromethane, a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.), or a hydrofluoroether (CF$_3$CH$_2$OCF$_2$CF$_2$H, etc.).

Further, in the presence of hydrogen fluoride (HF), the compound 5 is in an equilibrium state with an alcohol form having the hydrogen fluoride added to the O=C< moiety to form HO—CF<, and thus becomes an alcohol form. In the present specification, even when simply referred to as compound 5, it may represent one or both of compound 5 and the alcohol form.

As the perfluoroallylating agent, compound 6 may be mentioned.

$$CF_2\!=\!CFCF_2\text{-G} \qquad \text{Formula 6}$$

where G is —OSO$_2$F, —OSO$_2$R$^f$, a chlorine atom, a bromine atom or an iodine atom, and R$^f$ is a C$_{1-8}$ perfluoroalkyl group.

As the compound 6, compound 6-1 is preferred from the viewpoints of availability of raw materials, reactivity of the perfluoroallylating agent, ease of synthesis, and ease of handling.

  Formula 6-1

The compound 6-1 may be produced, for example, by reacting hexafluoropropylene with sulfur trioxide in the presence of boron trifluoride. Instead of boron trifluoride, a boron trifluoride diethyl ether complex or a Lewis acid such as trimethoxyborane may be used.

The reaction of the compound 5 with the perfluoroallylating agent is preferably carried out in the presence of a fluoride salt. The fluoride salt may, for example, be potassium fluoride, cesium fluoride, silver fluoride, quaternary ammonium fluoride or sodium fluoride.

The reaction temperature of the compound 5 and the perfluoroallylating agent is preferably from −70 to 40° C. The reaction solvent preferably contains an aprotic polar solvent, and more preferably consists solely of an aprotic polar solvent. The aprotic polar solvent may, for example, be monoglyme, diglyme, triglyme, tetraglyme, acetonitrile, propionitrile, adiponitrile, benzonitrile, dioxane, tetrahydrofuran, N,N-dimethylformamide, dimethyl sulfoxide, N-methylpyrrolidone or nitroethane. As the reaction solvent, two or more types may be used as mixed.

Second Embodiment of Acid-Type Sulfonic Acid Group-Containing Polymer

A second embodiment of the acid-type sulfonic acid group-containing polymer of the present invention is a polymer (hereinafter referred to as "polymer H2") having units u1.

Since the polymer H2 has units u1, it is excellent in hydrogen gas barrier properties.

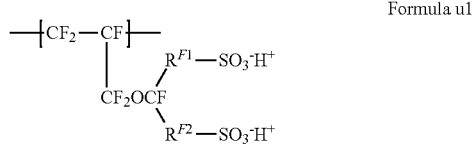  Formula u1

R$^{F1}$ and R$^{F2}$ are the same as R$^{F1}$ and R$^{F2}$ as described for units u1 of the polymer H1, and the preferred forms are also the same.

The mass reduction rate of the polymer H2 when immersed in hot water at 120° C. for 24 hours is at most 15 mass %, preferably at most 12 mass %, more preferably at most 10 mass %. When the mass reduction rate when immersed in hot water at 120° C. for 24 hours is at most the upper limit value of the above range, the hot water resistance of the polymer H2 is excellent. The lower the mass reduction rate, the better, and the lower limit is 0 mass %.

The hydrogen gas permeation coefficient of the polymer H2 under the conditions of a temperature of 80° C. and a relative humidity of 10% is preferably in the same range as the hydrogen gas permeation coefficient of the polymer H1 under the conditions of a temperature of 80° C. and a relative humidity of 10%.

The hydrogen gas permeation coefficient under the conditions of a temperature of 80° C. and a relative humidity of 10% and the mass reduction rate when immersed in hot water at 120° C. for 24 hours, of the polymer H2, can be adjusted by controlling, for example, the composition of the monomer units, the molecular weight (the TQ value of the polymer F2 as described later), the ion exchange capacity, etc. of the polymer H2.

The ion exchange capacity of the polymer H2 is preferably in the same range as the ion exchange capacity of the polymer H1.

The conductivity of the polymer H2 at a temperature of 80° C. and a relative humidity of 50% RH is preferably in the same range as the conductivity of the polymer H1 at a temperature of 80° C. and a relative humidity of 50% RH.

The polymer H2 may have units other than units u1, as the case requires, as long as the effects of the present invention are not impaired.

The units other than units u1 may be perfluoromonomer units other than units u1, or units based on another monomer.

The perfluoromonomer and another monomer may be the perfluoromonomer and another monomer as described for the polymer H1.

As the polymer H2, one which further has TFE units is preferred, from the viewpoint of excellent mechanical properties and chemical durability.

As the polymer H2, a perfluoropolymer is preferred from the viewpoint of excellent conductivity, mechanical properties and chemical durability.

As the polymer H2, one which does not have monomer units having a halogen atom other than a fluorine atom, is preferred.

Since the polymer H2 has units u1, it has excellent hydrogen gas barrier properties even if it does not have chlorotrifluoroethylene units. Therefore, it is not necessary to use a monomer having a halogen atom other than a fluorine atom, such as chlorotrifluoroethylene, when polymerizing the monomer to produce a polymer. As a result, a chain transfer reaction is unlikely to occur when the monomer is polymerized to produce a polymer, and the amount of an oligomer generated during production is small.

As the monomer having a halogen atom other than a fluorine atom, a monomer having a halogen atom other than a fluorine atom as described for the polymer H1 may be mentioned.

Among all units constituting the polymer H2, the ratio of units u1, TFE units and units other than units u1 and TFE units, may be suitably determined depending upon the characteristics and physical properties (hydrogen gas permeability, hot water resistance, ion exchange capacity, conductivity, mechanical strength, elastic modulus, softening temperature, etc.) required for the polymer H2.

The polymer H2 is obtainable, for example, by converting fluorosulfonyl groups (—SO$_2$F) of the polymer F2 described later into acid-type sulfonic acid groups (—SO$_3^-$H$^+$).

The method for converting fluorosulfonyl groups into acid-type sulfonic acid groups may be the same method as one described for the polymer H1, and the preferred forms are also the same.

In order to remove organic substances contained as impurities in the polymer H2, the organic substances may be decomposed by a treatment such as immersing the polymer H2 in a hydrogen peroxide solution after hydrolysis in a salt type or after conversion to an acid type.

The method for treating the polymer H2 may be the same method as one described for the polymer H1, and the preferred forms are also the same.

(Polymer F2)

Polymer F2 as a precursor of the polymer H2, is a polymer having units u2.

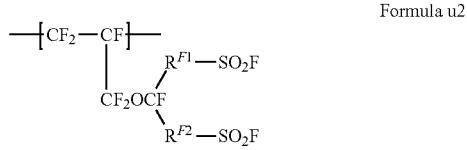

Formula u2

$R^{F1}$ and $R^{F2}$ are the same as $R^{F1}$ and $R^{F2}$ as described for units u1, and the preferred forms are also the same.

The TQ value of the polymer F2 is preferably at least 220° C., more preferably from 225 to 360° C., further preferably from 230 to 350° C. When the TQ value is a least the lower limit value in the above range, the polymer H2 has a sufficient molecular weight and is excellent in mechanical strength and hot water resistance. When the TQ value is at most the upper limit value in the above range, the solubility or dispersibility of the polymer H2 is improved, and the liquid composition described later can be easily prepared. The TQ value is an index for the molecular weight of the polymer F2.

The polymer F2 may have units other than units u1 as the case requires, as long as the effects of the present invention are not impaired.

Other units may be other units as described for the polymer H2.

As the polymer F2, one further having TFE units is preferred from such a viewpoint that it is possible to obtain a polymer H2 excellent in mechanical properties and chemical durability.

As the polymer F2, one which does not have monomer units having a halogen atom other than a fluorine atom, is preferred.

The monomer having a halogen atom other than the fluorine atom may be the monomer having a halogen atom other than a fluorine atom as described for the polymer H1.

Among all units constituting the polymer F2, the ratio of units u2, TFE units and units other than units u2 and TFE units, may be suitably determined depending upon the characteristics and physical properties (hydrogen gas permeability, hot water resistance, ion exchange capacity, conductivity, mechanical strength, elastic modulus, softening temperature, etc.) required for the polymer H2.

The polymer F2 may be produced, for example, by the same method as the polymer F1.

<Liquid Composition>

The liquid composition of the present invention comprises a polymer H1 or a polymer H2 (hereinafter collectively referred to as "polymer H") and a liquid medium. The liquid composition may be one in which the polymer H is dispersed in the liquid medium, or may be one in which the polymer H is dissolved in the liquid medium.

The liquid medium may be only water, may be only an organic solvent, or may contain water and an organic solvent, and it preferably contains water and an organic solvent.

Water improves the dispersibility or solubility of the polymer H in the liquid medium.

The organic solvent facilitates formation of a hardly breakable polymer electrolyte membrane.

As the organic solvent, at least one type of a $C_{1-4}$ alcohol is preferred from such a viewpoint that it will be easy to form a hardly breakable polymer electrolyte membrane.

The $C_{1-4}$ alcohol may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol or 3,3,3-trifluoro-1-propanol.

The proportion of water is preferably from 10 to 99 mass %, more preferably from 20 to 99 mass %, in the total of water and the organic solvent.

The proportion of the organic solvent is preferably from 1 to 90 mass %, more preferably from 1 to 80 mass %, in the total of water and the organic solvent.

When the proportions of water and the organic solvent are within the above ranges, the polymer H has excellent dispersibility in the dispersion medium, and it is easy to form a hardly breakable polymer electrolyte membrane.

The concentration of the polymer H in the liquid composition is preferably from 1 to 50 mass %, more preferably from 3 to 30 mass %. When the concentration of the polymer H is at least the lower limit value in the above range, a thick membrane can be stably obtained at the time of membrane formation. When the concentration of the polymer H is at most the upper limit value in the above range, it is possible to prevent the viscosity of the liquid composition from becoming excessively high.

The liquid composition may contain at least one type of metals, a metal compound, or a metal ion selected from the group consisting of cerium and manganese in order to further improve the durability of the polymer electrolyte membrane to be made from the liquid composition.

The liquid composition is obtainable by mixing the polymer H and a liquid medium.

The mixing method may be a method of applying shear such as stirring to the polymer H in the liquid medium under atmospheric pressure or in a state of being sealed in an autoclave or the like.

The temperature at the time of stirring is preferably from 0 to 250° C., more preferably from 20 to 150° C. If necessary, shearing such as ultrasonic waves may be applied.

Since the liquid composition of the present invention as described above contains the polymer H excellent in hydrogen gas barrier properties and hot water resistance and a small amount of an oligomer generated during production, it is possible to form a membrane excellent in hydrogen gas barrier properties and hot water resistance, in which the amount of an oligomer generated during production, is small.

<Polymer Electrolyte Membrane>

The polymer electrolyte membrane of the present invention is a membrane containing the polymer H.

The thickness of the polymer electrolyte membrane is preferably from 5 to 200 μm, more preferably from 10 to 130 μm. When the thickness of the polymer electrolyte membrane is at most the upper limit value in the above range, the membrane resistance can be sufficiently lowered. When the thickness of the polymer electrolyte membrane is at least the lower limit value in the above range, sufficient hydrogen gas barrier properties can be secured.

The polymer electrolyte membrane may be reinforced with a reinforcing material. The reinforcing material may, for example, be a porous material, fibers, a woven fabric or a non-woven fabric. The material for the reinforcing material may, for example, be polytetrafluoroethylene, a TFE-hexafluoropropylene copolymer, a TFE-perfluoro(alkyl vinyl ether) copolymer, polyethylene, polypropylene or polyphenylene sulfide.

The polymer electrolyte membrane may contain at least one type of metal, a metal compound, or a metal ion selected from the group consisting of cerium and manganese in order to further improve durability. Cerium and manganese decompose hydrogen peroxide, which is a causative substance that causes deterioration of the polymer electrolyte membrane.

The polymer electrolyte membrane may contain silica or a heteropolyacid (zirconium phosphate, phosphomolybdic acid, phosphotungstic acid, etc.) as a water retention agent for preventing drying.

The polymer electrolyte membrane can be formed, for example, by a method (cast method) in which the liquid composition of the present invention is applied to the surface of a base film or a catalyst layer and then dried. When the polymer electrolyte membrane further contains a reinforcing material, the polymer electrolyte membrane can be formed, for example, by impregnating the liquid composition of the present invention to the reinforcing material and drying it.

It is preferred to carry out heat treatment in order to stabilize the polymer electrolyte membrane. The heat treatment temperature is preferably from 130 to 200° C., although it depends on the type of the polymer H. When the heat treatment temperature is at least 130° C., the polymer H will not contain excessive water. When the heat treatment temperature is at most 200° C., the thermal decomposition of sulfonic acid groups is suppressed, and the decrease in the conductivity of the polymer electrolyte membrane is suppressed.

The polymer electrolyte membrane may be treated with a hydrogen peroxide solution, as the case requires.

The polymer electrolyte membrane of the present invention as described above contains the polymer H which is excellent in hydrogen gas barrier properties and hot water resistance and in which the amount of an oligomer generated during production is small, and therefore, it is excellent in hydrogen gas barrier properties and hot water resistance and in which the amount of an oligomer generated during production is small.

<Membrane Electrode Assembly>

FIG. 1 is a schematic cross-sectional view showing an example of the membrane electrode assembly of the present invention. The membrane electrode assembly 10 is provided with an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state in contact with the catalyst layers 11.

The catalyst layer 11 is a layer containing a catalyst and a polymer having ion exchange groups.

The catalyst may, for example, be a supported catalyst in which platinum or a platinum alloy is supported on a carbon carrier.

As the carbon carrier, carbon black powder may be exemplified.

The polymer having ion exchange groups may, for example, be the polymer H, or a perfluoropolymer having ion exchange groups other than the polymer H. The ion exchange groups of the polymer contained in the catalyst layer 11 are preferably an acid type, and acid-type sulfonic acid groups are preferred.

The gas diffusion layer 12 has a function of uniformly diffusing gas into the catalyst layer 11 and a function as a current collector. The gas diffusion layer 12 may, for example, be carbon paper, carbon cloth, carbon felt or the like. The gas diffusion layer 12 is preferably one having treated for water-repellency with polytetrafluoroethylene or the like.

The polymer electrolyte membrane 15 is the polymer electrolyte membrane of the present invention.

As shown in FIG. 2, the membrane electrode assembly 10 may have a carbon layer 16 between the catalyst layer 11 and the gas diffusion layer 12.

By disposing the carbon layer 16, the gas diffusivity at the surface of the catalyst layer 11 is improved, and the power generation characteristics of the polymer electrolyte fuel cell are greatly improved.

The carbon layer 16 is a layer containing carbon and a nonionic fluorinated polymer.

The carbon may, for example, be carbon particles, carbon fibers, etc., and carbon nanofibers having a fiber diameter of from 1 to 1,000 nm and a fiber length of at most 1,000 µm are preferred. The nonionic fluorinated polymer may, for example, be polytetrafluoroethylene.

In a case where the membrane electrode assembly 10 does not have the carbon layer 16, the membrane electrode assembly 10 is produced, for example, by the following methods.

A method in which catalyst layers 11 are formed on a polymer electrolyte membrane 15 to form a membrane catalyst layer assembly, and the membrane catalyst layer assembly is sandwiched between gas diffusion layers 12.

A method in which catalyst layers 11 are formed on gas diffusion layers 12 to serve as electrodes (anode 13 and cathode 14), and a polymer electrolyte membrane 15 is sandwiched between the electrodes.

In a case where the membrane electrode assembly 10 has the carbon layer 16, the membrane electrode assembly 10 is produced, for example, by the following methods.

A method in which a dispersion liquid containing carbon and a nonionic fluorinated polymer is applied on a base film and dried to form a carbon layer 16, a catalyst layer 11 is formed on the carbon layer, and the catalyst layer 11 and a polymer electrolyte membrane 15 are bonded, the base film is peeled off to form a membrane catalyst layer assembly having carbon layers 16, and the membrane catalyst layer assembly is sandwiched between gas diffusion layers 12.

A method in which a dispersion liquid containing carbon and a nonionic fluorinated polymer is applied on a gas diffusion layer 12 and dried to form a carbon layer 16, and a membrane catalyst layer assembly having a catalyst layer 11 formed on a polymer electrolyte membrane 15 is sandwiched by the gas diffusion layers 12 having a carbon layer 16.

The method for forming the catalyst layer 11 may, for example, be the following methods.

A method in which a coating liquid for forming a catalyst layer is applied on a polymer electrolyte membrane 15, a gas diffusion layer 12, or a carbon layer 16 and dried.

A method in which a coating liquid for forming a catalyst layer is applied on a base film and dried to form a catalyst layer 11, and the catalyst layer 11 is transferred onto a polymer electrolyte membrane 15.

The coating liquid for forming a catalyst layer is a liquid in which a polymer having ion exchange groups and a catalyst are dispersed in a dispersion medium. The coating liquid for forming a catalyst layer may be prepared, for example, by mixing a liquid composition containing a polymer having ion exchange groups and a dispersion liquid of the catalyst. The coating liquid for forming a catalyst layer may contain at least one type of metal, a metal compound, or a metal ion selected from the group consisting of cerium and manganese in order to further improve the durability of the catalyst layer 11.

In the membrane electrode assembly 10 as described above, since the polymer electrolyte membrane 15 contains the polymer H excellent in hydrogen gas barrier properties and hot water resistance, in which the amount of an oligomer generated during production is small, the polymer electrolyte membrane 15 is excellent in hydrogen gas barrier properties and hot water resistance, and the amount of an oligomer generated during production is small.

<Polymer Electrolyte Fuel Cell>

The polymer electrolyte fuel cell of the present invention is provided with the membrane electrode assembly of the present invention.

The polymer electrolyte fuel cell of the present invention may have separators having grooves formed as gas flow paths disposed on both sides of the membrane electrode assembly. The separators may, for example, be separators made of various conductive materials, such as metal separators, carbon separators, or separators made of a material obtained by mixing graphite and a resin.

In a polymer electrolyte fuel cell, electricity is generated by supplying a gas containing oxygen to the cathode and a gas containing hydrogen to the anode. The membrane electrode assembly may also be applied to a methanol fuel cell whereby electricity generation is conducted by supplying methanol to the anode.

In the polymer electrolyte fuel cell of the present invention, the polymer electrolyte membrane of the membrane electrode assembly contains the polymer H having excellent hydrogen gas barrier properties and hot water resistance, in which the amount of an oligomer generated during production is small, and therefore, the polymer electrolyte membrane is excellent in hydrogen gas barrier properties and hot water resistance, in which the amount of an oligomer generated during production is small.

<Ion Exchange Membrane for Water Electrolysis>

The ion exchange membrane for water electrolysis of the present invention is a membrane containing the polymer H.

The ion exchange membrane for water electrolysis of the present invention has a layer containing the polymer H and can be used for both an alkaline water electrolysis ion exchange membrane and a polymer electrolyte water electrolysis ion exchange membrane. The sulfonic acid groups in the polymer H are preferably in an acid type in the case of polymer electrolyte water electrolysis, and are preferably converted to a salt type in the case of alkaline water electrolysis. That is, in the case of polymer electrolyte water electrolysis, the membrane containing the polymer H can be used as it is. In the case of alkaline water electrolysis, the acid-type sulfonic acid groups in the membrane containing the polymer H may be converted to salt-type sulfonic acid groups before use, or the membrane containing the polymer H may be used as it is, since the acid-type sulfonic acid groups may be converted to salt-type sulfonic acid groups during operation.

The ion exchange membrane for water electrolysis as described above, contains the polymer H which is excellent in hydrogen gas barrier properties and hot water resistance and in which the amount of an oligomer generated during production is small, and therefore, it is excellent in hydrogen gas barrier properties and hot water resistance, and the amount of an oligomer generated during production is small.

EXAMPLES

Hereinafter, the present invention will be specifically described with reference to Examples, but the present invention is not limited to these Examples.

Ex. 1, Ex. 2, Ex. 4 and Ex. 6 are Production Examples, Ex. 3 and Ex. 8 are Examples of the present invention, and Ex. 5, Ex. 7, Ex. 9 and Ex. 10 are Comparative Examples.

Hereinafter, the polymer F1 and the polymer F2 are collectively referred to as "polymer F". Further, the acid-type sulfonic acid group-containing polymer according to the Comparative Examples is referred to as "polymer H'". Further, the fluorosulfonyl group-containing polymer according to the Comparative Examples is referred to as "polymer F'".

($^{1}$H-NMR)

$^{1}$H-NMR was measured under the conditions of frequency: 300.4 MHz and chemical shift standard: tetramethylsilane. Unless otherwise specified, $CD_3CN$ was used as the solvent. The quantification of the product was carried out from the analysis result of $^{1}$H-NMR and the amount of the internal standard sample (1,3-bis (trifluoromethyl) benzene) added.

($^{19}$F-NMR)

$^{19}$F-NMR was measured under the conditions of frequency: 282.7 MHz, solvent: $CD_3CN$, and chemical shift standard: $CFCl_3$. The quantification of the product was carried out from the analysis result of $^{19}$F-NMR and the amount of the internal standard sample (1,3-bis (trifluoromethyl) benzene) added.

($^{13}$C-NMR)

$^{13}$C-NMR was measured under the conditions of frequency: 75.5 MHz and chemical shift standard: tetramethylsilane. Unless otherwise specified, $CD_3CN$ was used as the solvent.

(Yield)

Yield means the yield of the reaction step× the yield of the purification step. The reaction yield means the yield of the reaction step before purifying the target product, which does not include the loss in the purification step.

(Ion Exchange Capacity)

The membrane of polymer F or polymer F' was vacuum dried at 120° C. for 12 hours. After measuring the mass of the membrane of the polymer after drying, the membrane of the polymer was immersed in a 0.85 mol/g sodium hydroxide solution (solvent: water/methanol=10/90 (mass ratio)) at 60° C. for at least 72 hours to hydrolyze fluorosulfonyl groups. The ion exchange capacity of the polymer F or polymer F' was determined by back-titration of the sodium hydroxide solution after the hydrolysis with 0.1 mol/L hydrochloric acid. In the present specification, the ion exchange capacity of the polymer H or polymer H' is described as being the same as the ion exchange capacity of the precursor polymer F or polymer F'.

(Proportions of Respective Units)

The proportions of the respective units in the polymer F or polymer F' were calculated from the ion exchange capacity of the polymer F or polymer F'.

The proportions of the respective units in the polymer H or polymer H' correspond to the proportions of the respective units in the polymer F or polymer F' and are therefore omitted.

(TQ value)

Using a flow tester (CFT-500A, manufactured by Shimadzu Corporation) equipped with a nozzle having a length of 1 mm and an inner diameter of 1 mm, the polymer F or polymer F' was melt extruded. The temperature (TQ value)

at which the extrusion amount of the polymer F or polymer F' became to be 100 mm³/sec was determined. When the TQ value exceeded 300° C., the TQ value was obtained by extrapolating from the measured value of the extrusion amount at 300° C. or lower. Extrapolation was performed by a logarithmic approximation of the correlation of the extrusion amount with respect to the reciprocal of absolute temperature. The higher the TQ value, the larger the molecular weight of the polymer.

(Conductivity)

A substrate on which 4-terminal electrodes are arranged at 5 mm intervals is brought into close contact with a membrane of the polymer H or polymer H' having a width of 5 mm, and by a known 4-terminal method, the resistance of the membrane of the polymer H or polymer H' was measured under constant temperature and humidity conditions at a temperature of 80° C. and the relative humidity of 50% at AC: 10 kHz and voltage: 1 V, and the conductivity was calculated. Here, the standard dimensions and thickness of the membrane used in the calculation were measured under the conditions of temperature: 23° C. and relative humidity: 50% RH.

(Hot Water Resistance)

A membrane of the polymer H or polymer H' was placed in a glove box purged with nitrogen, dried at room temperature (about 15 to 25° C.) for at least 40 hours, and then the mass (W1) was measured. In a 120 mL sealed container, ultrapure water in an amount in which the membrane was sufficiently immersed and a membrane of the polymer H or polymer H' were put, and the sealed container was placed in an oven at 120° C. After 24 hours, the heating was stopped, and the sealed container was cooled with water, and then the membrane of the polymer H or polymer H' was withdrawn from the sealed container, and the water on the surface was wiped off with a filter paper (No. 2 manufactured by Advantec Toyo Kaisha, Ltd.). The membrane of the polymer H or polymer H' was put in a nitrogen-purged glove box and dried at room temperature (about 15 to 25° C.) for at least 40 hours, and then the mass (W2) was measured. The mass reduction rate (mass %) was calculated from the following formula.

Mass reduction rate={(W1−W2)/W1}×100

(Oligomer Content)

Since the oligomer component generated by the polymerization is dissolved in the precipitation solvent filtered by the precipitation and reprecipitation operations, the content of the oligomer component can be quantified by measuring the mass of the residual solid content obtained by drying the precipitation solvent. The oligomer content (mass %) was calculated from the following formula and evaluated according to the following standards.

Oligomer content=(mass of solid content obtained by drying)/{(mass of solid content obtained by drying)+(polymer yield)}×100

○: Oligomer content is less than 30 mass %.

x: Oligomer content is at least 30 mass %.

(Hydrogen Gas Permeation Coefficient)

With respect to a polymer electrolyte membrane, the hydrogen gas permeation coefficient was measured in accordance with JIS K 7126-2: 2006. As the measuring device, a gas permeability measuring device (GTR-100XFAG manufactured by GTR TEC Corporation) was used.

A polymer electrolyte membrane having an effective permeation area of 9.62 cm² was kept at 80° C., and hydrogen gas having a relative humidity adjusted to be 10% was permitted to flow on the first surface at 30 mL/min, and on the second surface, argon gas having a relative humidity adjusted to be 10% was permitted to flow at 30 mL/min. The hydrogen gas permeating to the argon gas was detected by gas chromatography, and the hydrogen gas permeation amount as calculated by volume at 25° C. and 1 atm was obtained. Using the obtained hydrogen gas permeation amount, the permeability of the gas permeated per second per 1 cm² of the membrane area and at the pressure difference of 1 cmHg of the permeated gas, was obtained, and the value converted into a 1 cm thick membrane was adopted to be the hydrogen gas permeation coefficient. The standard dimensions and thickness of the membrane used in the calculation were measured under the conditions of temperature: 23° C. and relative humidity: 50% RH.

Abbreviations

TFE: Tetrafluoroethylene,
CTFE: Chlorotrifluoroethylene,
PSVE: $CF_2=CFOCF_2CF(CF_3)OCF_2CF_2SO_2F$,
P2SVE: $CF_2=CFOCF_2CF(CF_2OCF_2CF_2SO_2F)OCF_2CF_2SO_2F$,
sPSVE: $CF_2=CFOCF_2CF_2SO_2F$,
PSAE: $CF_2=CFCF_2OCF_2CF_2SO_2F$,
PFtBPO: $(CF_3)_3COOC(CF_3)_3$,
AIBN: $(CH_3)_2C(CN)N=NC(CH_3)_2(CN)$,
IPP: $(CH_3)_2CHOC(O)OOC(O)OCH(CH_3)_2$,
V-601: $CH_3OC(O)C(CH_3)_2-N=N-C(CH_3)_2C(O)OCH_3$,
tBPO: $(CH_3)_3COOC(CH_3)_3$,
PFB: $CF_3CF_2CF_2C(O)OOC(O)CF_2CF_2CF_3$,
HFC-52-13p: $CF_3(CF_2)_5H$,
HFE-347pc-f: $CF_3CH_2OCF_2CF_2H$,
HCFC-225cb: $CClF_2CF_2CHClF$,
HCFC-141b: $CH_3CCl_2F$.

[Ex. 1]

(Ex. 1-1)

Into a 2 L four-necked flask equipped with a stirrer, a condenser, a thermometer and a dropping funnel, 560 g of chlorosulfonic acid was charged under a nitrogen gas sealing. The flask was cooled in an ice bath, and a mixed solution of 139.5 g of compound 1-1 and 478.7 g of dichloromethane was added dropwise over 20 minutes while keeping the internal temperature to be at most 20° C. Heat generation and gas generation were observed during dropping. After completion of the dropping, the flask was set in an oil bath and the reaction was conducted for 7 hours while keeping the internal temperature to be from 30 to 40° C. The reaction proceeded with the generation of gas, and a white solid was precipitated. After the reaction, the pressure inside the flask was reduced and dichloromethane was distilled off. A yellowish white solid remained in the flask. When the solid was analyzed by ¹H-NMR, it was confirmed that compound 2-1 was formed.

$$O=C(CH_3)(CH_3) \xrightarrow{ClSO_3H, CH_2Cl_2} O=C(CH_2-SO_3H)(CH_2-SO_3H)$$

Formula 1-1      Formula 2-1

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C=O).

(Ex. 1-2)

Compound 2-1 obtained in Ex. 1-1 was not isolated and was used as it was in the next reaction. 2,049 g of thionyl chloride was added to the flask in Ex. 1-1. The flask was heated to 80° C. and refluxed for 15 hours. As the reaction proceeded, the reflux temperature increased from 52° C. to 72° C. Gas generation was confirmed during the reaction. The point at which all of compound 2-1 was dissolved and the gas generation stopped was taken as the reaction end point. When the reaction solution was transferred to a 2 L separable flask and allowed to cool for 9 hours while sealing the gas phase with nitrogen gas, a dark brown solid was precipitated in the separable flask. Unreacted thionyl chloride was removed by decantation. Toluene was added to wash the precipitated solid, and again by decantation, the toluene was removed. Toluene washing was carried out a total of 3 times, and the total amount of toluene used was 1,207 g. The precipitated solid was dried at 25° C. for 71 hours under a nitrogen gas stream. The solid after the drying was recovered and analyzed by $^1$H-NMR, whereby it was confirmed that 356.5 g of compound 3-1 having a purity of 96.2% was obtained. The yield based on compound 1-1 was 56.0%.

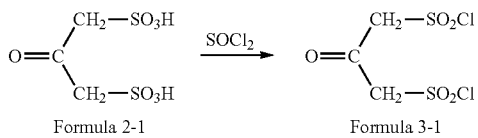

Formula 2-1    Formula 3-1

NMR spectrum of compound 3-1:
$^1$H-NMR: 5.20 ppm (—CH$_2$—, 4H, s).
$^{13}$C-NMR: 72.3 ppm (—CH$_2$—), 184.6 ppm (C=O).

(Ex. 1-3)

Into a 1 L four-necked flask equipped with a stirrer, a condenser and a thermometer, 90.0 g of compound 3-1 and 750 mL of acetonitrile were charged under a nitrogen gas sealing. The flask was cooled in an ice bath, and 110.3 g of potassium hydrogen fluoride was added with stirring. The heat generation associated with the addition was slight. The ice bath was changed to a water bath, and the reaction was carried out for 62 hours while maintaining the internal temperature to be from 15 to 25° C. Along with the reaction, a fine white solid was formed. The reaction solution was transferred to a pressure filter, and unreacted potassium hydrogen fluoride and the product were separated by filtering. Acetonitrile was added to the filter, and the separated solid was washed until the filtrate became transparent, and the washing solution was recovered. Acetonitrile was distilled off by applying the filtrate and the washing solution to an evaporator. 950 mL of toluene was added to the solid remaining after drying, and the mixture was heated to 100° C. to dissolve the solid in toluene. The dissolved liquid was filtered by gravity filtration to remove undissolved components. When the filtrate was transferred to a 1 L separable flask and left to cool for 14 hours while sealing the gas phase with nitrogen gas, light brown needle-like crystals were precipitated in the separable flask. The crystals were washed with toluene and dried at 25° C. for 30 hours under a nitrogen gas stream. When the dried solid was recovered and analyzed by $^1$H-NMR and $^{19}$F-NMR, it was confirmed that 58.1 g of compound 4-1 having a purity of 97.6% was obtained. The yield based on compound 3-1 was 72.3%.

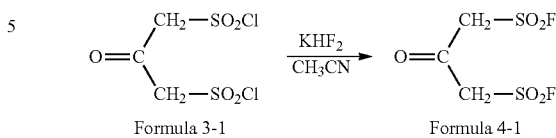

Formula 3-1    Formula 4-1

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C=O).

(Ex. 1-4)

Into a 200 mL nickel autoclave, 9.93 g of compound 4-1 and 89.7 g of acetonitrile were charged. The autoclave was cooled, nitrogen gas was fed at a flow rate of 6.7 L/hr while maintaining the internal temperature to be from 0 to 5° C., and the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. 103.2 g of the reaction solution was recovered from the autoclave. When the reaction solution was quantitatively analyzed by $^{19}$F-NMR, it was confirmed that compound 5-1 was contained in an amount of 8.4 mass %. The reaction yield based on compound 4-1 was 66%.

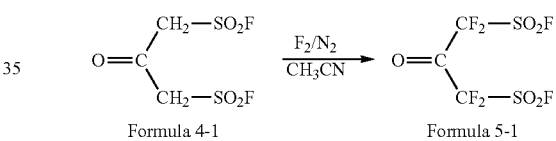

Formula 4-1    Formula 5-1

NMR spectrum of compound 5-1:
$^{19}$F-NMR: −104.1 ppm (—CF$_2$—, 4F, s), 45.8 ppm (—SO$_2$F, 2F, s).

(Ex. 1-5)

Into a 200 mL nickel autoclave, 19.9 g of compound 4-1 and 85.6 g of acetonitrile were charged. The autoclave was cooled, nitrogen gas was fed at a flow rate of 6.7 L/hr while maintaining the internal temperature to be from 0 to 5° C., and the reaction solution was bubbled for 1 hour. While maintaining the temperature of the reaction solution to be from 0 to 5° C., a mixed gas of fluorine gas and nitrogen gas (mixing ratio=10.3 mol %/89.7 mol %) was introduced at a flow rate of 16.4 L/hr over a period of 6.5 hours. Nitrogen gas was fed again at a flow rate of 6.7 L/hr, and the reaction solution was bubbled for 1 hour. 109.6 g of the reaction solution containing compound 5-1 was recovered from the autoclave.

(Ex. 1-6)

Into a 200 mL nickel autoclave, 20.1 g of compound 4-1 and 80.1 g of acetonitrile were charged. The autoclave was cooled, nitrogen gas was fed at a flow rate of 6.7 L/hr while maintaining the internal temperature to be from 0 to 5° C., and the reaction solution was bubbled for 1 hour. While maintaining the temperature of the reaction solution to be from 0 to 5° C., a mixed gas of fluorine gas and nitrogen gas (mixing ratio=20.0 mol %/80.0 mol %) was introduced at a flow rate of 8.4 L/hr for 6 hours. Nitrogen gas was fed again at a flow rate of 6.7 L/hr, and the reaction solution was bubbled for 1 hour. 107.1 g of the reaction solution containing compound 5-1 was recovered from the autoclave.

(Ex. 1-7)

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, and while maintaining the internal temperature to be from 0 to 10° C. with stirring, 8.43 g of the reaction solution obtained in Ex. 1-4 was added dropwise using a plastic syringe. Strong heat generation was confirmed, and it took 15 minutes for the dropping. After completion of the dropping, the ice bath was replaced with a water bath, and the reaction was carried out at from 15 to 20° C. for 1 hour. The mixture was cooled again in an ice bath, and 6.56 g of compound 6-1 was added dropwise from the dropping funnel while maintaining the temperature of the reaction solution to be from 0 to 10° C. After completion of the dropping, the ice bath was replaced with a water bath and the reaction was carried out at 20 to 25° C. for 3.5 hours. By-product solid was removed from the reaction solution by suction filtration, and the filtrate was recovered. The filtered residual solid was washed with an appropriate amount of acetonitrile, and the washing liquid was mixed with the filtrate. When 37.1 g of the filtrate was quantitatively analyzed by $^{19}$F-NMR, it was confirmed that compound 7-1 was contained in an amount of 2.04 mass %. The reaction yield based on compound 4-1 was 46.6%.

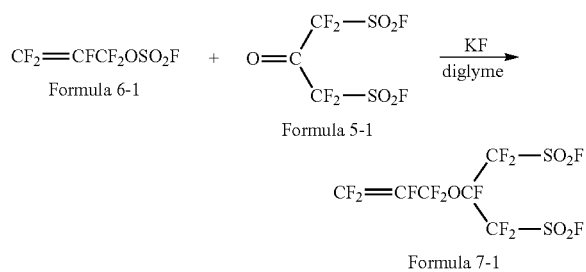

NMR spectrum of compound 7-1:

$^{19}$F-NMR: —191.5 ppm ($CF_2$=CF—, 1F, ddt, J=116, 38, 14 Hz), —133.8 ppm (—O—CF—, 1F, tt, J=21.3, 6.1 Hz), –103.1 ppm (—$CF_2$—$SO_2$F, 4F, m), –101.5 ppm ($CF_2$=CF—, 1F, ddt, J=116, 49, 27 Hz), –87.6 ppm ($CF_2$=CF—, 1F, ddt, J=49, 38, 7 Hz), –67.5 ppm (—$CF_2$—O—, 2F, m), 46.8 ppm (—$SO_2$F, 2F, s).

(Ex. 1-8)

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and while keeping the internal temperature to be from 0 to 10° C. with stirring, 79.8 g of the reaction solution obtained in Ex. 1-5 was added dropwise using a plastic dropping funnel. Strong heat generation was confirmed, and it took 23 minutes for the dropping. After completion of the dropping, the ice bath was replaced with a water bath, and the reaction was carried out at from 20 to 30° C. for 5.5 hours. The mixture was cooled again in an ice bath, and 146.0 g of compound 6-1 was added dropwise from the dropping funnel while maintaining the temperature of the reaction solution to be from 0 to 10° C. After completion of the dropping, the ice bath was replaced with a water bath and the reaction was carried out at from 15 to 25° C. for 16 hours. Suction filtration was carried out in the same manner as in Ex. 1-7, and 412.3 g of the obtained filtrate was quantitatively analyzed by $^{19}$F-NMR, whereby it was confirmed that compound 7-1 was contained in an amount of 3.93 mass %. The reaction yield based on compound 4-1 was 55.9%. The filtrate was distilled under reduced pressure to isolate compound 7-1 as a fraction having a boiling point of 97.2° C./10 kPa. The gas chromatography purity was 98.0%.

(Ex. 1-9)

Into a 50 mL four-necked flask equipped with a stirrer, a condenser, a thermometer and a dropping funnel, 3.70 g of potassium fluoride and 10.9 g of acetonitrile were charged. The flask was cooled in an ice bath, and while keeping the internal temperature to be from 0 to 10° C. with stirring, 10.2 g of the reaction solution obtained in Ex. 1-6 was added dropwise using a plastic syringe. Strong heat generation was confirmed, and it took 8 minutes for the dropping. After completion of the dropping, the ice bath was replaced with a water bath, and the reaction was carried out at from 20 to 30° C. for 3 hours. The mixture was cooled again in an ice bath, and 14.6 g of compound 6-1 was added dropwise from the dropping funnel while maintaining the temperature of the reaction solution to be from 0 to 10° C. After completion of the dropping, the ice bath was replaced with a water bath, and the reaction was carried out at from 15 to 25° C. for 17 hours. Suction filtration was performed in the same manner as in Ex. 1-7, and 55.9 g of the obtained filtrate was quantitatively analyzed by $^{19}$F-NMR, whereby it was confirmed that compound 7-1 was contained in an amount of 4.77 mass %. The reaction yield based on compound 4-1 was 69.6%. The reaction yield based on compound 1-1 (reaction yield in the entire monomer synthesis step) was 28.2%.

[Ex. 2]

(Ex. 2-1)

Into an autoclave (internal volume 100 mL, made of stainless steel), 70.0 g of compound 7-1 was put, cooled with liquid nitrogen and degassed. Into the autoclave, 2.53 g of TFE was introduced and heated in an oil bath until the internal temperature reached 100° C. The pressure at this time was 0.29 MPa (gauge pressure). A mixed solution of 36.3 mg of PFtBPO as a polymerization initiator and 2.58 g of HFC-52-13p was injected into the autoclave. Furthermore, nitrogen gas was introduced from the injection line, and the injecting liquid in the injection line was completely pushed in. As a result of having TFE of the gas phase diluted by this operation, the pressure increased to 0.56 MPa (gauge pressure). While maintaining the pressure to be 0.56 MPa (gauge pressure), polymerization was carried out by continuously adding TFE. When the amount of TFE added reached 4.03 g in 9.5 hours, the inside of the autoclave was cooled to stop the polymerization, and the gas in the system was purged. The reaction solution was diluted with HFC-52-13p, HFE-347pc-f was added, and the polymer was precipitated and filtered. Then, the operation of stirring the polymer in HFC-52-13p and reprecipitating with HFE-347pc-f was repeated twice. Vacuum drying was conducted at 120° C. to obtain 6.4 g of polymer F-1 as a copolymer of TFE and compound 7-1. The results are shown in Table 1. When HFC-52-13p and HFE-347pc-f used for precipitation were dried to dryness, 0.1 g of an oligomer component was extracted. That is, the oligomer content was at most 2 mass %.

(Ex. 2-2 to Ex. 2-10)

The respective conditions in Ex. 2-1 were changed as shown in Table 1. However, in Ex. 2-2 to Ex. 2-10, the initial charging of TFE was not performed, and instead, TFE was charged by injecting TFE to the pressure before dilution with nitrogen gas as shown in Table 1 while heating to the polymerization temperature. In Ex. 2-2, 36.1 g of HFC-52-13p was charged together with compound 7-1, and 5.0 g was used to prepare a mixed solution with the polymerization initiator. In Ex. 2-6 to Ex. 2-10, instead of injecting the polymerization initiator in an initial batch, after diluting with nitrogen gas to a predetermined polymerization pressure, a 0.20 mass % solution of tBPO (in Ex. 2-10, a 0.05 mass % solution) dissolved in compound 7-1, was intermittently added from the injection line at the start of polymerization and every 30 minutes (the total amount of the polymerization initiator and compound 7-1 added, is shown in Table 1). Except for this, polymers F-2 to F-10 were obtained in the same manner as in Ex. 2-1. The results are shown in Table 1.

of polymer F and convert it to —$SO_3K$. Further, the polymer membrane was immersed in a 3 mol/L hydrochloric acid aqueous solution at 50° C. for 30 minutes, and then immersed in ultrapure water at 80° C. for 30 minutes. The cycle of immersion in the aqueous hydrochloric acid solution and immersion in ultrapure water was carried out a total of 5 times to convert —$SO_3K$ of the polymer to —$SO_3H$. Washing with ultrapure water was repeated until the pH of the water in which the polymer membrane was immersed became 7. The polymer membrane was sandwiched between filter papers and air-dried to obtain a membrane of polymer H. The results are shown in Table 2.

TABLE 1

|   | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 | Ex. 2-10 |
|---|---|---|---|---|---|---|---|---|---|---|
| Reactor volume [mL] | 100 | 100 | 100 | 100 | 100 | 100 | 100 | 100 | 100 | 100 |
| Compound 7-1 [g] | 70.0 | 35.0 | 80.0 | 82.0 | 104.9 | 75.2 | 72.6 | 78.1 | 119.4 | 75.9 |
| Initially charged TFE [g] | 2.53 | — | — | — | — | — | — | — | — | — |
| HFC-52-13p [g] | 2.58 | 41.1 | 4.23 | 4.18 | 3.05 | 0 | 0 | 0 | 0 | 0 |
| Polymerization initiator | PFtBPO | PFtBPO | PFtBPO | PFtBPO | tBPO | tBPO | tBPO | tBPO | tBPO | tBPO |
| Amount of polymerization initiator [mg] | 36.3 | 76.0 | 41.4 | 42.3 | 21.7 | 10.4 | 6.3 | 16.1 | 18.8 | 2.95 |
| Polymerization temperature [° C.] | 100 | 100 | 100 | 100 | 125 | 160 | 160 | 150 | 150 | 160 |
| Pressure before dilution with nitrogen gas [MPaG] | 0.29 | 0.32 | 0.29 | 0.25 | 0.36 | 0.37 | 0.40 | 0.425 | 0.41 | 0.37 |
| Polymerization pressure [MPaG] | 0.56 | 0.60 | 0.56 | 0.49 | 0.67 | 0.75 | 0.80 | 0.82 | 0.80 | 0.85 |
| Continuously added TFE [g] | 4.03 | 10.29 | 5.59 | 6.49 | 7.65 | 7.22 | 6.85 | 13.6 | 15.2 | 4.83 |
| Polymerization time [hr.] | 9.5 | 7.0 | 6.9 | 10.0 | 10.5 | 8.5 | 8.5 | 10.0 | 8.0 | 10.0 |
| Obtained polymer F | F-1 | F-2 | F-3 | F-4 | F-5 | F-6 | F-7 | F-8 | F-9 | F-10 |
| Yield of polymer F [g] | 6.4 | 12.9 | 8.47 | 10.0 | 11.7 | 15.0 | 13.9 | 24.7 | 29.9 | 10.2 |
| Compound 7-1 units [mol %] | 13.8 | 8.1 | 12.4 | 14.1 | 15.1 | 21.3 | 19.8 | 16.9 | 18.2 | 19.9 |
| TFE units [mol %] | 86.2 | 91.9 | 87.6 | 85.9 | 84.9 | 78.7 | 80.2 | 83.1 | 81.8 | 80.1 |
| Ion exchange capacity [milliequivalent/g dry resin] | 1.87 | 1.27 | 1.74 | 1.90 | 1.99 | 2.46 | 2.35 | 2.14 | 2.24 | 2.36 |
| TQ value [° C.] | 238 | 294 | 298 | 314 | 272 | 251 | 310 | 303 | 301 | 381 |
| Oligomer content | ○ | ○ | ○ | ○ | ○ | ○ | ○ | ○ | ○ | ○ |

[Ex. 3]

(Ex. 3-1 to Ex. 3-10)

Using the polymers F-1 to F-10 obtained in Ex. 2, membranes of polymer H-1 to polymer H-10 were obtained by the following method.

TABLE 2

|   | Ex. 3-1 | Ex. 3-2 | Ex. 3-3 | Ex. 3-4 | Ex. 3-5 | Ex. 3-6 | Ex. 3-7 | Ex. 3-8 | Ex. 3-9 | Ex. 3-10 |
|---|---|---|---|---|---|---|---|---|---|---|
| Polymer F used | F-1 | F-2 | F-3 | F-4 | F-5 | F-6 | F-7 | F-8 | F-9 | F-10 |
| Alkaline aqueous solution used | Aqueous solution A | Aqueous solution B | Aqueous solution C | Aqueous solution A | Aqueous solution A | Aqueous solution A | Aqueous solution A | Aqueous solution A | Aqueous solution A | Aqueous solution A |
| Obtained polymer H | H-1 | H-2 | H-3 | H-4 | H-5 | H-6 | H-7 | H-8 | H-9 | H-10 |
| Conductivity [S/cm] | 0.132 | 0.054 | 0.123 | 0.134 | 0.150 | 0.201 | 0.195 | 0.176 | 0.182 | 0.19 |
| Hot water resistance [mass %] | 10 | 0.1 | 8 | 3 | 7 | 11 | 6 | 7 | 5 | 2 |

Polymer F is press molded at a temperature of 10° C. higher than the TQ value or 260° C., whichever is lower, and under 4 MPa (gauge pressure) to obtain a membrane of polymer F (thickness 100 to 250 μm). The membrane of polymer F was immersed in the alkaline aqueous solution shown in Table 2 at 80° C. for 16 hours to hydrolyze —$SO_2F$ In Table 2, the aqueous solution A is potassium hydroxide/water=20/80 (mass ratio), the aqueous solution B is potassium hydroxide/dimethyl sulfoxide/water=15/30/55 (mass ratio), and the aqueous solution C is potassium hydroxide/methanol/water=15/20/65 (mass ratio). These definitions are the same also in Tables 4, 8 and 9.

[Ex. 4]

(Ex. 4-1 to Ex. 4-4)

The respective conditions in Ex. 2-1 were changed as shown in Table 3. However, in Ex. 4-1 to Ex. 4-4, the initial charging of TFE was not performed, but instead after heating to the polymerization temperature, TFE was charged to the pressure before dilution with nitrogen gas as shown in Table 3. Other than that, polymers F'-1 to F'-4 were obtained in the same manner as in Ex. 2-1. The results are shown in Table 3.

TABLE 3

|  | Ex. 4-1 | Ex. 4-2 | Ex. 4-3 | Ex. 4-4 |
| --- | --- | --- | --- | --- |
| Reactor volume [mL] | 100 | 100 | 100 | 100 |
| Compound 7-1 [g] | 103.0 | 129.5 | 117.0 | 74.9 |
| Initially charged TFE [g] | — | — | — | — |
| HFC-52-13p [g] | 6.46 | 3.48 | 3.52 | 2.5 |
| Polymerization initiator | PFtBPO | tBPO | tBPO | tBPO |
| Amount of polymerization initiator [mg] | 105.8 | 26.7 | 24.2 | 11.6 |
| Polymerization temperature [° C.] | 100 | 125 | 125 | 160 |
| Pressure before dilution with nitrogen gas [MPaG] | 0.10 | 0.18 | 0.245 | 0.34 |
| Polymerization pressure [MPaG] | 0.60 | 0.37 | 0.47 | 0.70 |
| Continuously added TFE [g] | 3.84 | 3.08 | 3.84 | 4.64 |
| Polymerization time [hr.] | 12.5 | 8.0 | 8.0 | 8.0 |
| Obtained polymer F' | F'-1 | F'-2 | F'-3 | F'-4 |
| Yield of polymer F' [g] | 7.61 | 4.0 | 6.3 | 8.2 |
| Compound 7-1 units [mol %] | 20.0 | 22.2 | 19.3 | 21.4 |
| TFE units [mol %] | 80.0 | 77.8 | 80.7 | 78.6 |
| Ion exchange capacity [milliequivalent/g dry resin] | 2.37 | 2.52 | 2.32 | 2.47 |
| TQ value [° C.] | 158 | 175 | 191 | 213 |
| Oligomer content | ◯ | ◯ | ◯ | ◯ |

[Ex. 5]

(Ex. 5-1 to Ex. 5-4)

Polymers F'-1 to F'-4 were treated in the same manner as in Ex. 3 to obtain membranes of polymers H'-1 to H'-4. The results are shown in Table 4.

TABLE 4

|  | Ex. 5-1 | Ex. 5-2 | Ex. 5-3 | Ex. 5-4 |
| --- | --- | --- | --- | --- |
| Polymer F' used | F'-1 | F'-2 | F'-3 | F'-4 |
| Alkaline aqueous solution used | Aqueous solution A | Aqueous solution A | Aqueous solution A | Aqueous solution A |
| Obtained polymer H' | H'-1 | H'-2 | H'-3 | H'-4 |
| Conductivity [S/cm] | 0.197 | 0.191 | 0.197 | 0.212 |
| Hot water resistance [mass %] | (Dissolved) | (Dissolved) | (Dissolved) | (Dissolved) |

[Ex. 6]

(Ex. 6-1)

Into a Hastelloy autoclave having an internal volume of 230 mL, 123.8 g of PSVE, 35.2 g of HCFC-225cb and 63.6 mg of AIBN were put, cooled with liquid nitrogen and degassed. The temperature was raised to 70° C., TFE was introduced into the system, and the pressure was maintained at 1.14 MPa (gauge pressure). TFE was continuously added so that the pressure became constant at 1.14 MPa (gauge pressure). After 7.9 hours, when the amount of TFE added reached 12.4 g, the autoclave was cooled, and the gas in the system was purged to terminate the reaction. The polymer solution was diluted with HCFC-225cb, and then HCFC-141b was added for precipitation. After washing with HCFC-225cb and HCFC-141b, the mixture was dried to obtain 25.1 g of polymer F'-5 as a copolymer of TFE and PSVE. The results are shown in Table 5.

(Ex. 6-2 to Ex. 6-9)

Except that the respective conditions in Ex. 6-1 were changed as shown in Table 5 or Table 6, TFE and PSVE, P2SVE or sPSVE were copolymerized in the same manner as in Ex. 6-1 to obtain polymers F'-6 to F'-13. The results are shown in Table 5 or Table 6.

(Ex. 6-10)

Into an autoclave (internal volume 230 mL, made of stainless steel), 175.0 g of PSAE was put, cooled with liquid nitrogen and degassed. The mixture was heated in an oil bath until the internal temperature reached 110° C., and TFE was introduced into the system to maintain the pressure at 0.27 MPa (gauge pressure).

A mixed solution of 55.3 mg of PFtBPO as a polymerization initiator and 8.45 g of HFC-52-13p was injected into the autoclave. Furthermore, nitrogen gas was introduced from the injecting line, and the injecting liquid in the injection line was completely pushed in. As a result of having TFE in the gas phase diluted by this operation, the pressure increased to 0.68 MPa (gauge pressure). Polymerization was carried out by continuously adding TFE while maintaining the pressure at 0.68 MPa (gauge pressure). When the amount of TFE added reached 11.25 g in 5.0 hours, the inside of the autoclave was cooled to stop the polymerization, and the gas in the system was purged. After the reaction solution was diluted with HFC-52-13p, HFE-347pc-f was added, so that the polymer was precipitated and filtered. Then, the operation of stirring the polymer in HFC-52-13p and reprecipitating with HFE-347pc-f, was repeated twice. Vacuum drying was conducted at 120° C. to obtain polymer F'-14 as a copolymer of TFE and PSAE. The results are shown in Table 7.

(Ex. 6-11)

The respective conditions in Ex. 6-10 were changed as shown in Table 7. However, in Ex. 6-11, instead of injecting the polymerization initiator in a batch at the initial stage, after diluting with nitrogen gas to a predetermined polymerization pressure, a 0.50 mass % solution of PFtBPO dissolved in PSAE was added intermittently from the injection line at the start of polymerization and every 60 minutes (the total amount of the polymerization initiator and PSAE added is shown in Table 7). Other than that, in the same manner as in Ex. 6-10, polymer F'-15 was obtained. The results are shown in Table 7.

(Ex. 6-12)

Into a stainless steel autoclave having an internal volume of 495 mL, 400.1 g of P2SVE was charged, and freeze-pump-thaw degassing was carried out twice using liquid nitrogen. 14.96 g of CTFE was charged while the pressure was reduced. After raising the temperature to 25° C., TFE was introduced until it reached 0.295 MPa (gauge pressure). After confirming that the pressure did not change, 3.02 g of a 2.8 mass % solution of PFB dissolved in HCFC-225cb was added under pressure with nitrogen gas, and the addition line was washed with 4.02 g of HCFC-225cb. While keeping the temperature and pressure constant, TFE was continuously supplied and polymerized. After 6.5 hours from the start of polymerization, the autoclave was cooled to stop the polymerization reaction, and the gas in the system was purged to obtain a solution of polymer F'-16.

The solution of polymer F'-16 and 1,100 g of HFE-347pc-f at −25° C. were mixed to precipitate polymer F'-16, followed by filtering. Then, the operation of stirring the polymer in HFE-347pc-f and filtering it was repeated twice. Vacuum drying was conducted at 120° C. to obtain 14.1 g of polymer F'-16 as a copolymer of TFE, CTFE and P2SVE. The results are shown in Table 6. When HFE-347pc-f used for precipitation was dried to dryness, 8.6 g of an oligomer component was extracted. That is, the oligomer content was 38 mass %.

TABLE 5

|  | Ex. 6-1 | Ex. 6-2 | Ex. 6-3 | Ex. 6-4 | Ex. 6-5 | Ex. 6-6 | Ex. 6-7 |
|---|---|---|---|---|---|---|---|
| Reactor volume [mL] | 230 | 230 | 1000 | 1000 | 2500 | 230 | 100 |
| SO$_2$F group-containing monomer | PSVE | PSVE | P2SVE | P2SVE | P2SVE | sPSVE | sPSVE |
| Amount of SO$_2$F group-containing monomer [g] | 123.8 | 159.0 | 901.7 | 328.0 | 1996 | 160.2 | 90.0 |
| HCFC-225cb [g] | 35.2 | 0.8 | 0 | 415.5 | 20.0 | 1.00 | 1.00 |
| Polymerization initiator | AIBN | IPP | IPP | V-601 | V-601 | IPP | IPP |
| Amount of polymerization initiator [mg] | 63.6 | 47.9 | 90.7 | 223.7 | 399.0 | 128.1 | 90.5 |
| Polymerization temperature [° C.] | 70 | 40 | 40 | 70 | 57 | 40 | 40 |
| Polymerization pressure [MPaG] | 1.14 | 0.46 | 0.55 | 0.69 | 0.76 | 0.53 | 0.90 |
| Polymerization time [hr.] | 7.9 | 13.6 | 7.0 | 3.7 | 14.5 | 10.0 | 4.5 |
| Obtained polymer F' | F'-5 | F'-6 | F'-7 | F'-8 | F'-9 | F'-10 | F'-11 |
| Yield of polymer F' [g] | 25.1 | 28.1 | 64.8 | 104.1 | 382.2 | 22.5 | 22.2 |
| Units based on SO$_2$F group-containing monomer [mol %] | 17.8 | 28.7 | 18.4 | 11.9 | 19.6 | 25.3 | 16.1 |
| TFE units [mol %] | 82.2 | 71.3 | 81.6 | 88.1 | 80.4 | 74.7 | 83.9 |
| Ion exchange capacity [milliequivalent/g dry resin] | 1.10 | 1.44 | 1.87 | 1.46 | 1.93 | 1.74 | 1.25 |
| TQ value [° C.] | 223 | 239 | 296 | 241 | 240 | 255 | 317 |
| Oligomer content | ◯ | ◯ | ◯ | ◯ | ◯ | ◯ | ◯ |

TABLE 6

|  | Ex. 6-8 | Ex. 6-9 | Ex. 6-12 |
|---|---|---|---|
| Reactor volume [mL] | 100 | 125 | 495 |
| SO$_2$F group-containing monomer | SPSVE | SPSVE | P2SVE |
| Amount of SO$_2$F group-containing monomer [g] | 90.0 | 90.0 | 400.1 |
| HCFC-225cb [g] | 0.99 | 0.99 | 6.96 |
| Polymerization initiator | PFB | PFB | PFB |
| Amount of polymerization initiator [mg] | 26.7 | 26.9 | 84.6 |
| Polymerization temperature [C] | 24 | 24 | 25 |
| Polymerization pressure [MPaG] | 0.28 | 0.20 | 0.295 |
| Polymerization time [hr.] | 11.0 | 22.5 | 6.5 |
| Obtained polymer F' | F'-12 | F'-13 | F'-16 |
| Yield of polymer F' [g] | 5.0 | 6.1 | 14.1 |
| Units based on SO$_2$F group-containing monomer [mol %] | 27.5 | 33.0 | 17.2 |
| TFE units [mol %] | 72.5 | 67.0 | 29.2 |
| CTFE units [mol %] | — | — | 53.6 |
| Ion exchange capacity [milliequivalent/g dry resin] | 1.84 | 2.07 | 1.73 |
| TQ value [° C.] | 266 | 231 | 253 |
| Oligomer content | ◯ | ◯ | × |

TABLE 7

|  | Ex. 6-10 | Ex. 6-11 |
|---|---|---|
| Reactor volume [mL] | 230 | 230 |
| PSAE [g] | 175.0 | 175.0 |
| Initially charged TFE [g] | — | — |
| HFC-52-13p [g] | 8.45 | 0 |
| Polymerization initiator | PFtBPO | PFtBPO |
| Amount of polymerization initiator [mg] | 55.3 | 35.7 |
| Polymerization temperature [° C.] | 110 | 120 |
| Pressure before dilution with nitrogen gas [MPaG] | 0.27 | 0.28 |
| Polymerization pressure [MPaG] | 0.68 | 0.63 |
| Continuously added TFE [g] | 11.25 | 9.15 |
| Polymerization time [hr.] | 5.0 | 5.6 |
| Obtained polymer F' | F'-14 | F'-15 |
| Yield of polymer F' [g] | 18.8 | 15.6 |
| PSAE units [mol %] | 17.0 | 20.4 |
| TFE units [mol %] | 83.0 | 79.6 |
| Ion exchange capacity [milliequivalent/g dry resin] | 1.22 | 1.39 |
| TQ value [° C.] | 240 | 240 |
| Oligomer content | ◯ | ◯ |

[Ex. 7]

(Ex. 7-1 to Ex. 7-12)

Polymers F'-5 to F'-16 were treated in the same manner as in Ex. 3 to obtain membranes of polymers H'-5 to H'-16. The results are shown in Table 8 or Table 9.

TABLE 8

|  | Ex. 7-1 | Ex. 7-2 | Ex. 7-3 | Ex. 7-4 | Ex. 7-5 | Ex. 7-6 | Ex. 7-7 |
|---|---|---|---|---|---|---|---|
| Polymer F' used | F'-5 | F'-6 | F'-7 | F'-8 | F'-9 | F'-10 | F'-11 |
| Alkaline aqueous solution used | Aqueous solution B | Aqueous solution C | Aqueous solution C | Aqueous solution B | Aqueous solution A | Aqueous solution C | Aqueous solution B |
| Obtained polymer H' | H'-5 | H'-6 | H'-7 | H'-8 | H'-9 | H'-10 | H'-11 |
| Conductivity [S/cm] | 0.054 | 0.077 | 0.151 | 0.102 | 0.171 | 0.128 | 0.071 |
| Hot water resistance [mass %] | 0.1 | 4 | 5 | 0.7 | 5 | — | — |

|  | Ex. 7-8 | Ex. 7-9 | Ex. 7-10 | Ex. 7-11 | Ex. 7-12 |
|---|---|---|---|---|---|
| Polymer F' used | F'-12 | F'-13 | F'-14 | F'-15 | F'-16 |
| Alkaline aqueous solution used | Aqueous solution C | Aqueous solution A | Aqueous solution C | Aqueous solution C | Aqueous solution A |
| Obtained polymer H' | H'-12 | H'-13 | H'-14 | H'-15 | H'-16 |

-continued

|  | Ex. 7-8 | Ex. 7-9 | Ex. 7-10 | Ex. 7-11 | Ex. 7-12 |
|---|---|---|---|---|---|
| Conductivity [S/cm] | 0.157 | 0.162 | 0.058 | 0.075 | 0.155 |
| Hot water resistance [mass %] | 3 | 33 | 3 | 15 | 2 |

[Ex. 8]

(Ex. 8-1)

To a 100 mL container made of polytetrafluoroethylene (PTFE), 4.3 g of a finely cut membrane of polymer H-1 and 75 g of ultrapure water were added and heated for 24 hours at 200° C. The content was transferred to a PTFE vat and air-dried at 30° C. for 64 hours in a nitrogen atmosphere. The dried polymer H-1 was transferred to a 200 mL glass autoclave, and 21.4 g of a mixed solvent of ultrapure water/ethanol (50/50 (mass ratio)) was added. After stirring at 110° C. for 25 hours, 3.87 g of ultrapure water was added and diluted. After stirring at 90° C. for 5 hours, the mixture was left to cool, and filtered using a pressure filter (filter paper: manufactured by Advantec Toyo Kaisha, Ltd., PF040) to obtain 31.9 g of a liquid composition S-1 having polymer H-1 dispersed in a mixed solvent in an amount of 13.5 mass %.

The liquid composition S-1 was coated on a 100 μm ethylene-tetrafluoroethylene copolymer sheet by a die coater to form a membrane, this membrane was dried at 80° C. for 15 minutes and further heat-treated at 185° C. for 30 minutes to obtain a polymer electrolyte membrane composed of the membrane of polymer H (thickness 25 μm). The results are shown in Table 10.

(Ex. 8-2 to Ex. 8-10)

In the same manner as in Ex. 8-1 except that the amounts of the respective components charged were changed, liquid compositions S-2 to S-10 having the solid content concentrations as shown in Table 10 were obtained.

In the same manner as in Ex. 8-1 except that the liquid composition was changed, a polymer electrolyte membrane made of a membrane of polymer H (thickness 25 μm) was obtained. The results are shown in Table 10.

[Ex. 9]

(Ex. 9-1 to Ex. 9-4)

In the same manner as in Ex. 8-1 except that the amounts of the respective components charged were changed, liquid compositions S'-1 to S'-4 having the solid content concentrations as shown in Table 11 were obtained.

In the same manner as in Ex. 8-1 except that the liquid composition was changed, a polymer electrolyte membrane made of a membrane of polymer H' (thickness 25 μm) was obtained. The results are shown in Table 11.

With respect to the membrane using any of the polymers H'-1 to H'-4, the membrane strength was low, and the membrane was torn during the measurement of the hydrogen gas permeation coefficient, and thus, it was impossible to measure the hydrogen gas permeation coefficient.

TABLE 11

|  | Ex. 9-1 | Ex. 9-2 | Ex. 9-3 | Ex. 9-4 |
|---|---|---|---|---|
| Polymer H' used | H'-1 | H'-2 | H'-3 | H'-4 |
| Liquid composition used | S'-1 | S'-2 | S'-3 | S'-4 |
| Solid content concentration [mass %] | 10 | 2.5 | 2.5 | 2.5 |
| Hydrogen gas permeation coefficient [$cm^3 \cdot cm/(s \cdot cm^2 \cdot cmHg)$] | — | — | — | — |

[Ex. 10]

(Ex. 10-1)

Into an autoclave (internal volume 200 mL, made of glass), 20 g of a finely cut membrane of polymer H'-5 and 56.9 g of a mixed solvent of ethanol/water (60/40 (mass ratio)) were added, and the autoclave was heated with stirring. After stirring at 115° C. for 16 hours, the mixture was left to cool and filtered using a pressure filter (filter paper: manufactured by Advantec Toyo Kaisha, Ltd., PF040) to obtain 76.5 g of liquid composition S'-5 having polymer H'-5 dispersed in the mixed solvent.

In the same manner as in Ex. 8-1 except that the liquid composition S'-5 was used, a polymer electrolyte membrane made of a membrane of polymer H'-5 (thickness 25 μm) was obtained. The results are shown in Table 12.

(Ex. 10-2 to Ex. 10-12)

In the same manner as in Ex. 10-1 except that the amounts of the respective components charged were changed, liquid compositions S'-6 to S'-16 having the solid content concentrations as shown in Table 12 or Table 13, were obtained.

TABLE 10

|  | Ex. 8-1 | Ex. 8-2 | Ex. 8-3 | Ex. 8-4 | Ex. 8-5 | Ex. 8-6 | Ex. 8-7 | Ex. 8-8 | Ex. 8-9 | Ex. 8-10 |
|---|---|---|---|---|---|---|---|---|---|---|
| Polymer H used | H-1 | H-2 | H-3 | H-4 | H-5 | H-6 | H-7 | H-8 | H-9 | H-10 |
| Liquid composition used | S-1 | S-2 | S-3 | S-4 | S-5 | S-6 | S-7 | S-8 | S-9 | S-10 |
| Solid content concentration [mass %] | 13.5 | 2.0 | 2.1 | 10.9 | 12.6 | 2.5 | 2.5 | 12.3 | 5.0 | 5.0 |
| Hydrogen gas permeation coefficient [$cm^3 \cdot cm/(s \cdot cm^2 \cdot cmHg)$] | $2.1 \times 10^{-9}$ | $1.0 \times 10^{-9}$ | $1.6 \times 10^{-9}$ | $2.0 \times 10^{-9}$ | $2.0 \times 10^{-9}$ | $1.7 \times 10^{-9}$ | $1.8 \times 10^{-9}$ | $2.0 \times 10^{-9}$ | $1.9 \times 10^{-9}$ | $1.8 \times 10^{-9}$ |

In the same manner as in Ex. 10-1 except that the liquid composition was changed, a polymer electrolyte membrane made of a membrane of polymer H' (thickness 25 μm) was obtained. The results are shown in Table 12 or Table 13.

TABLE 12

|  | Ex. 10-1 | Ex. 10-2 | Ex. 10-3 | Ex. 10-4 | Ex. 10-5 | Ex. 10-6 | Ex. 10-7 |
|---|---|---|---|---|---|---|---|
| Polymer H' used | H'-5 | H'-6 | H'-7 | H'-8 | H'-9 | H'-10 | H'-11 |
| Liquid composition used | S'-5 | S'-6 | S'-7 | S'-8 | S'-9 | S'-10 | S'-11 |

TABLE 12-continued

|  | Ex. 10-1 | Ex. 10-2 | Ex. 10-3 | Ex. 10-4 | Ex. 10-5 | Ex. 10-6 | Ex. 10-7 |
|---|---|---|---|---|---|---|---|
| Solid content concentration [mass %] | 26.0 | 20.0 | 9.8 | 5.0 | 15.0 | 2.5 | 8.5 |
| Hydrogen gas permeation coefficient [$cm^3 \cdot cm/(s \cdot cm^2 \cdot cmHg)$] | $5.5 \times 10^{-9}$ | $4.7 \times 10^{-9}$ | $3.4 \times 10^{-9}$ | $3.1 \times 10^{-9}$ | $3.5 \times 10^{-9}$ | $3.3 \times 10^{-9}$ | $3.0 \times 10^{-9}$ |

|  | Ex. 10-8 | Ex. 10-9 | Ex. 10-10 | Ex. 10-11 | Ex. 10-12 |
|---|---|---|---|---|---|
| Polymer H' used | H'-12 | H'-13 | H'-14 | H'-15 | H'-16 |
| Liquid composition used | S'-12 | S'-13 | S'-14 | S'-15 | S'-16 |
| Solid content concentration [mass %] | 2.5 | 2.5 | 23.7 | 17.7 | 13.6 |
| Hydrogen gas permeation coefficient [$cm^3 \cdot cm/(s \cdot cm^2 \cdot cmHg)$] | $3.2 \times 10^{-9}$ | $2.9 \times 10^{-9}$ | $3.0 \times 10^{-9}$ | $3.3 \times 10^{-9}$ | $3.4 \times 10^{-9}$ |

INDUSTRIAL APPLICABILITY

The acid-type sulfonic acid group-containing polymer of the present invention is useful as a polymer electrolyte membrane or the like in a membrane electrode assembly for a polymer electrolyte fuel cell.

This application is a continuation of PCT Application No. PCT/JP2019/047936, filed on Dec. 6, 2019, which is based upon and claims the benefit of priority from Japanese Patent Application No. 2018-230213 filed on Dec. 7, 2018. The contents of those applications are incorporated herein by reference in their entireties.

REFERENCE SYMBOLS

10: membrane electrode assembly, 11: catalyst layer, 12: gas diffusion layer, 13: anode, 14: cathode, 15: polymer electrolyte membrane, 16: carbon layer.

What is claimed is:

1. An acid-type sulfonic acid group-containing polymer comprising perfluoromonomer units, no monomer units having a halogen atom other than a fluorine atom, and acid type sulfonic acid groups, said polymer having a hydrogen gas permeability coefficient under conditions of a temperature of 80° C. and a relative humidity of 10%, of at most $2.5 \times 10^{-9}$ $cm^3 \cdot cm/(s \cdot cm^2 \cdot cmHg)$ and a mass reduction rate when immersed in hot water at 120° C. for 24 hours of at most 15 mass %, wherein said acid-type sulfonic acid group-containing polymer comprises units represented by the following formula u1 as the perfluoromonomer units:

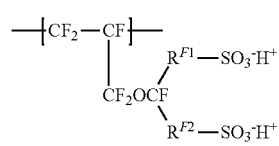

Formula u1 where $R^{F1}$ sand $R^{F2}$ are each independently a $C_{1-3}$ perfluoroalkylene group.

2. The acid-type sulfonic acid group-containing polymer according to claim 1, wherein said polymer has an ion exchange capacity of from 1.10 to 2.50 milliequivalent/g dry resin.

3. The acid-type sulfonic acid group-containing polymer according to claim 1, wherein a precursor of the acid-type sulfonic acid group-containing polymer having acid-type sulfonic acid groups, said precursor having fluorosulfonyl groups rather than acid-type sulfonic acid groups, has a TQ value of at least 220° C.

4. The acid-type sulfonic acid group-containing polymer according to claim 1, which is a perfluoropolymer comprising perfluoromonomer units having a sulfonic acid group and perfluoromonomer units not having a sulfonic acid group or a sulfonic acid precursor group.

5. The acid-type sulfonic acid group-containing polymer according to claim 4, which comprises tetrafluoroethylene units as the perfluoromonomer units not having a sulfonic acid group or a sulfonic acid precursor group.

6. An acid-type sulfonic acid group-containing polymer comprising units represented by the following formula u1, said polymer having a mass reduction rate when immersed in hot water at 120° C. for 24 hours of at most 15 mass %:

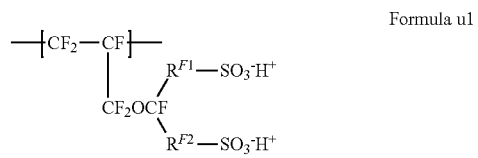

Formula u1 where $R^{F1}$ and $R^{F2}$ are each independently a $C_{1-3}$ perfluoroalkylene group.

7. The acid-type sulfonic acid group-containing polymer according to claim 6, wherein said polymer has an ion exchange capacity is of from 1.10 to 2.50 milliequivalent/g dry resin.

8. The acid-type sulfonic acid group-containing polymer according to claim 6, wherein a precursor of the acid-type sulfonic acid group-containing polymer comprising units represented by formula u1, said precursor having fluorosulfonyl groups rather than acid-type sulfonic acid groups, has a TQ value of at least 220° C.

9. The acid-type sulfonic acid group-containing polymer according to claim 6, wherein said polymer has a hydrogen gas permeability coefficient under the conditions of a temperature of 80° C. and a relative humidity of 10% of at most $2.5 \times 10^{-9}$ $cm^3 \cdot cm/(s \cdot cm^2 \cdot cmHg)$.

10. A liquid composition comprising the acid-type sulfonic acid group-containing polymer as defined in claim 1 and a liquid medium.

11. A polymer electrolyte membrane comprising the acid-type sulfonic acid group-containing polymer as defined in claim 1.

12. A membrane electrode assembly comprising an anode having a catalyst layer, a cathode having a catalyst layer, and the polymer electrolyte membrane as defined in claim 11, which is disposed between the anode and the cathode.

13. A polymer electrolyte fuel cell comprising the membrane electrode assembly as defined in claim 12.

14. An ion exchange membrane for water electrolysis, comprising the acid-type sulfonic acid group-containing polymer as defined in claim 1.

15. The acid-type sulfonic acid group-containing polymer according to claim 1, wherein said polymer has a hydrogen gas permeability coefficient under conditions of a temperature of 80° C. and a relative humidity of 10% of at least $1.0 \times 10^{-12}$ cm$^3$·cm/(s·cm$^2$·cmHg) and at most $2.2 \times 10^{-9}$ cm$^3$·cm/(s·cm$^2$·cmHg).

16. A liquid composition comprising the acid-type sulfonic acid group-containing polymer as defined in claim 6 and a liquid medium.

17. A polymer electrolyte membrane comprising the acid-type sulfonic acid group-containing polymer as defined in claim 6.

18. A membrane electrode assembly comprising an anode having a catalyst layer, a cathode having a catalyst layer, and the polymer electrolyte membrane as defined in claim 17, which is disposed between the anode and the cathode.

19. A polymer electrolyte fuel cell comprising the membrane electrode assembly as defined in claim 18.

20. An ion exchange membrane for water electrolysis, comprising the acid-type sulfonic acid group-containing polymer as defined in claim 6.

\* \* \* \* \*